(12) United States Patent
Farmer et al.

(10) Patent No.: US 11,820,276 B2
(45) Date of Patent: Nov. 21, 2023

(54) APPARATUS AND METHOD FOR STORING AND DEPLOYING SHEETS OF FLEXIBLE MATERIAL

(71) Applicant: FARMER INNOVATIONS LLC, Vancouver, WA (US)

(72) Inventors: Jason Farmer, Vancouver, WA (US); Lance Lowell Nordby, Hillsboro, OR (US)

(73) Assignee: Farmer Innovations LLC, Vancouver, WA (US)

( * ) Notice: Subject to any disclaimer, the term of this patent is extended or adjusted under 35 U.S.C. 154(b) by 406 days.

(21) Appl. No.: 16/867,491

(22) Filed: May 5, 2020

(65) Prior Publication Data
US 2021/0347291 A1 Nov. 11, 2021

(51) Int. Cl.
| | |
|---|---|
| *B60P 7/08* | (2006.01) |
| *B60P 7/04* | (2006.01) |
| *B60P 7/02* | (2006.01) |
| *A01M 1/24* | (2006.01) |
| *E04D 13/16* | (2006.01) |
| *B60J 7/10* | (2006.01) |
| *B66F 9/00* | (2006.01) |

(Continued)

(52) U.S. Cl.
CPC ............. *B60P 7/08* (2013.01); *A01M 1/24* (2013.01); *E04D 13/176* (2013.01); *B60J 7/102* (2013.01); *B60P 7/02* (2013.01); *B60P 7/04* (2013.01); *B66F 9/00* (2013.01); *E04H 4/103* (2013.01)

(58) Field of Classification Search
CPC .... B60P 7/02; B60P 7/04; B60P 7/065; B60P 7/08; B60P 7/0876; A01M 1/24; E04D 13/176; B60J 7/0092; B60J 7/102; E04H 4/10; E04H 4/103; E04H 4/105; B66F 7/00; B66F 9/00
USPC .......... 414/391, 592; 52/2.11, 3; 296/100.11, 296/98; 49/477.1
See application file for complete search history.

(56) References Cited

U.S. PATENT DOCUMENTS

| | | | |
|---|---|---|---|
| 4,471,500 A * | 9/1984 | Long ...................... | E04H 4/101 4/502 |
| 5,152,575 A | 10/1992 | DeMonte et al. | |

(Continued)

FOREIGN PATENT DOCUMENTS

| | | | |
|---|---|---|---|
| DE | 29720390 | 2/1998 | |
| SE | 507194 | 4/1998 | |
| WO | WO-2013038434 A1 * | 3/2013 | .............. B60J 7/085 |

OTHER PUBLICATIONS

International Search Report and Written Opinion from International Application No. PCT/US2021/030726, dated Aug. 12, 2021, 8 pages.

*Primary Examiner* — Dennis H Pedder
*Assistant Examiner* — Joyce Eileen Hill
(74) *Attorney, Agent, or Firm* — Klarquist Sparkman, LLP

(57) ABSTRACT

A sheet of flexible material can be deployed or stored by unfurling or furling the sheet using one or more inflatables. After the sheet is deployed to, for example, cover a load on a flatbed trailer, the inflatable can be deflated for storage. A sheet that has been removed from the load can be stored by placing an inflatable along an edge of the sheet. The inflatable is pressurized, and the sheet is furled onto the inflatable by rolling the inflatable. The inflatable is deflated and rolled up with the sheet for storage.

45 Claims, 17 Drawing Sheets

(51) Int. Cl.
*E04H 4/10* (2006.01)
*E04D 13/17* (2006.01)

(56) References Cited

U.S. PATENT DOCUMENTS

| | | | | |
|---|---|---|---|---|
| 5,697,664 | A * | 12/1997 | Chenowth | B60J 7/068 |
| | | | | 296/98 |
| 5,983,467 | A | 11/1999 | Duffy | |
| 6,142,553 | A * | 11/2000 | Bodecker | B60J 7/085 |
| | | | | 296/100.11 |
| 6,502,709 | B1 | 1/2003 | Parker | |
| 7,182,387 | B2 | 2/2007 | Hartman et al. | |
| 8,075,240 | B2 | 12/2011 | Stevenson et al. | |
| 8,348,563 | B2 * | 1/2013 | Buxton | B60P 7/12 |
| | | | | 410/50 |
| 9,072,343 | B1 | 7/2015 | Ogilvie | |
| 9,403,547 | B2 * | 8/2016 | Ellington | B65D 19/38 |
| 10,400,462 | B2 * | 9/2019 | South, Jr. | E04B 1/3211 |
| 10,569,625 | B1 | 2/2020 | Munter | |
| 2002/0073629 | A1 * | 6/2002 | Finell | B60P 7/065 |
| | | | | 52/3 |
| 2006/0010783 | A1 | 1/2006 | Evans | |
| 2006/0073748 | A1 * | 4/2006 | Boujon | E04H 4/103 |
| | | | | 441/40 |
| 2006/0239791 | A1 * | 10/2006 | Morris | B60J 7/102 |
| | | | | 410/119 |
| 2011/0308743 | A1 * | 12/2011 | Gurdebeke | E04H 4/101 |
| | | | | 160/405 |
| 2014/0241300 | A1 | 8/2014 | Park et al. | |
| 2016/0221810 | A1 * | 8/2016 | Schueler | B62B 3/0618 |
| 2018/0334020 | A1 * | 11/2018 | Garnick | B60J 11/04 |

* cited by examiner

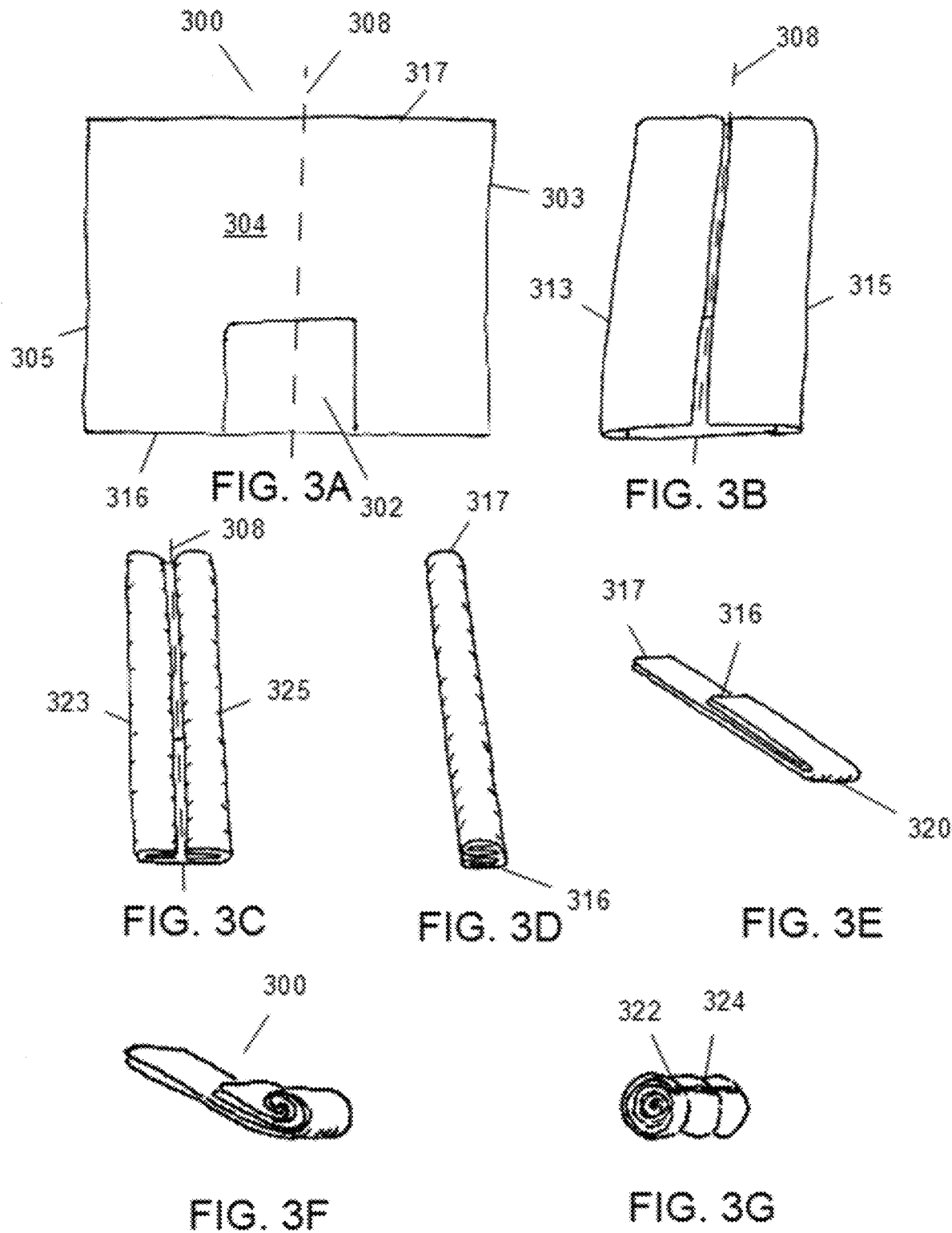

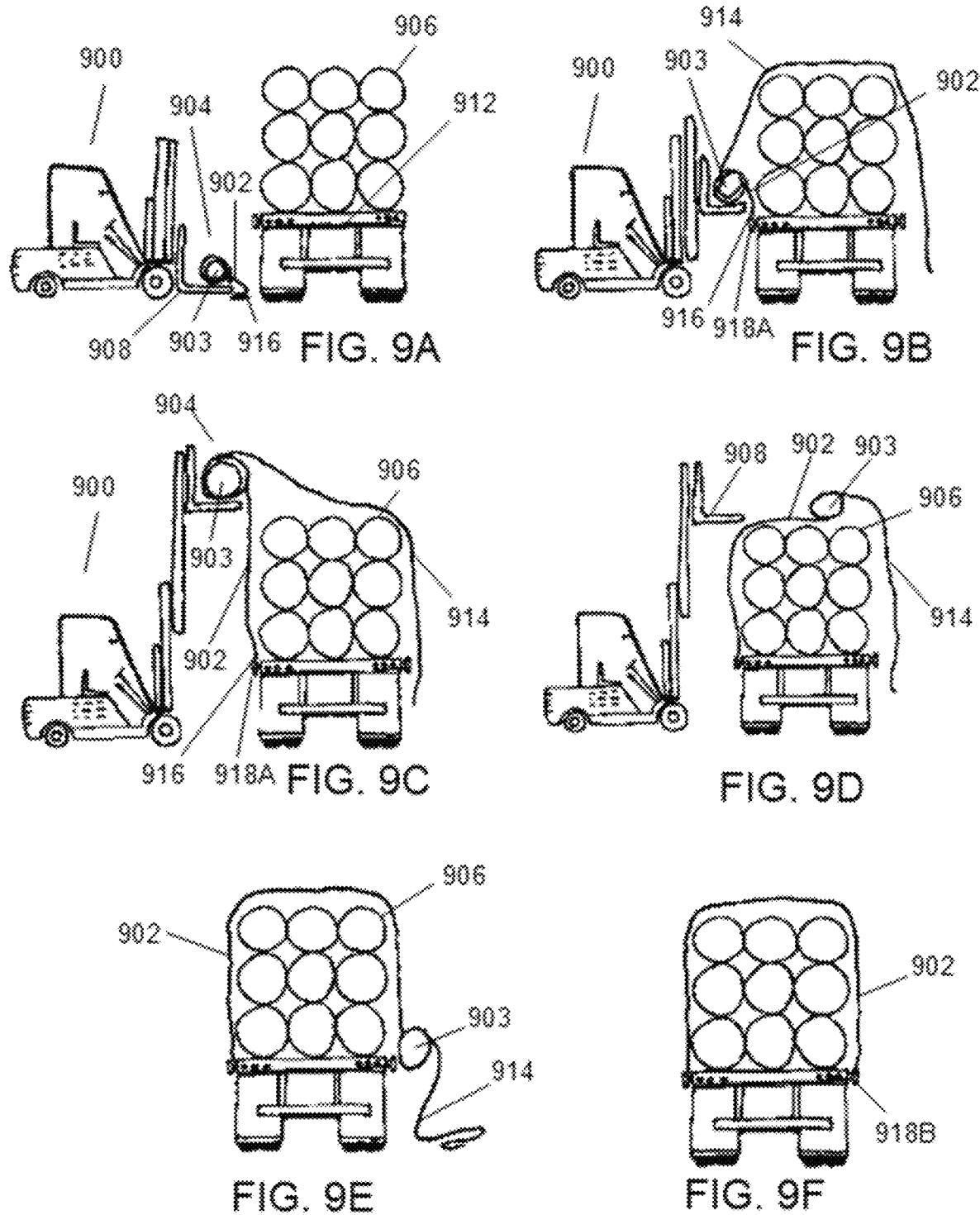

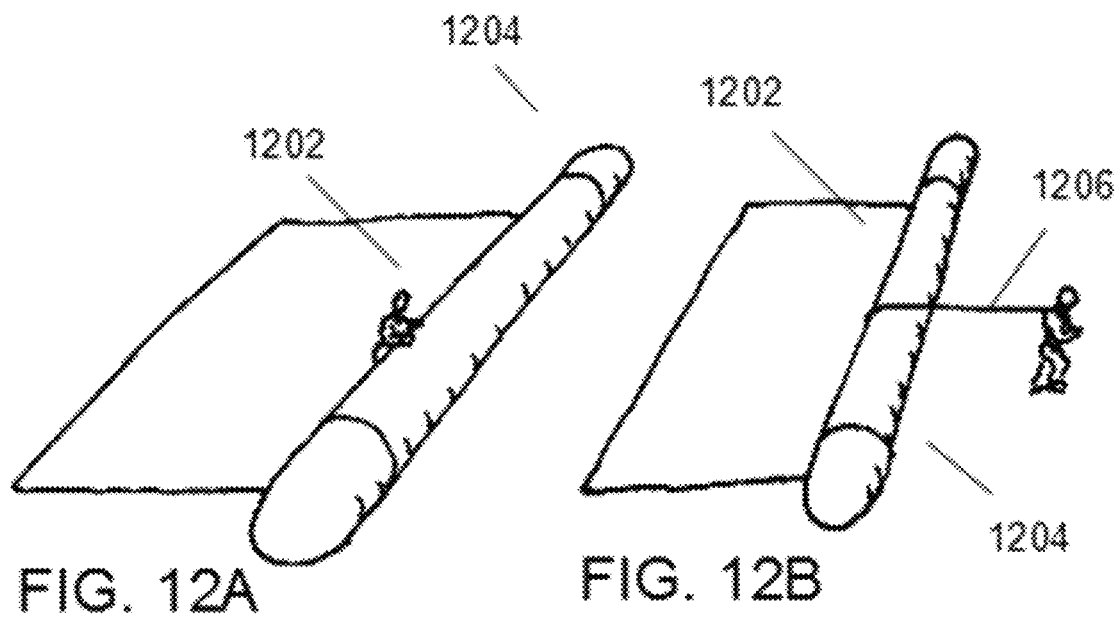
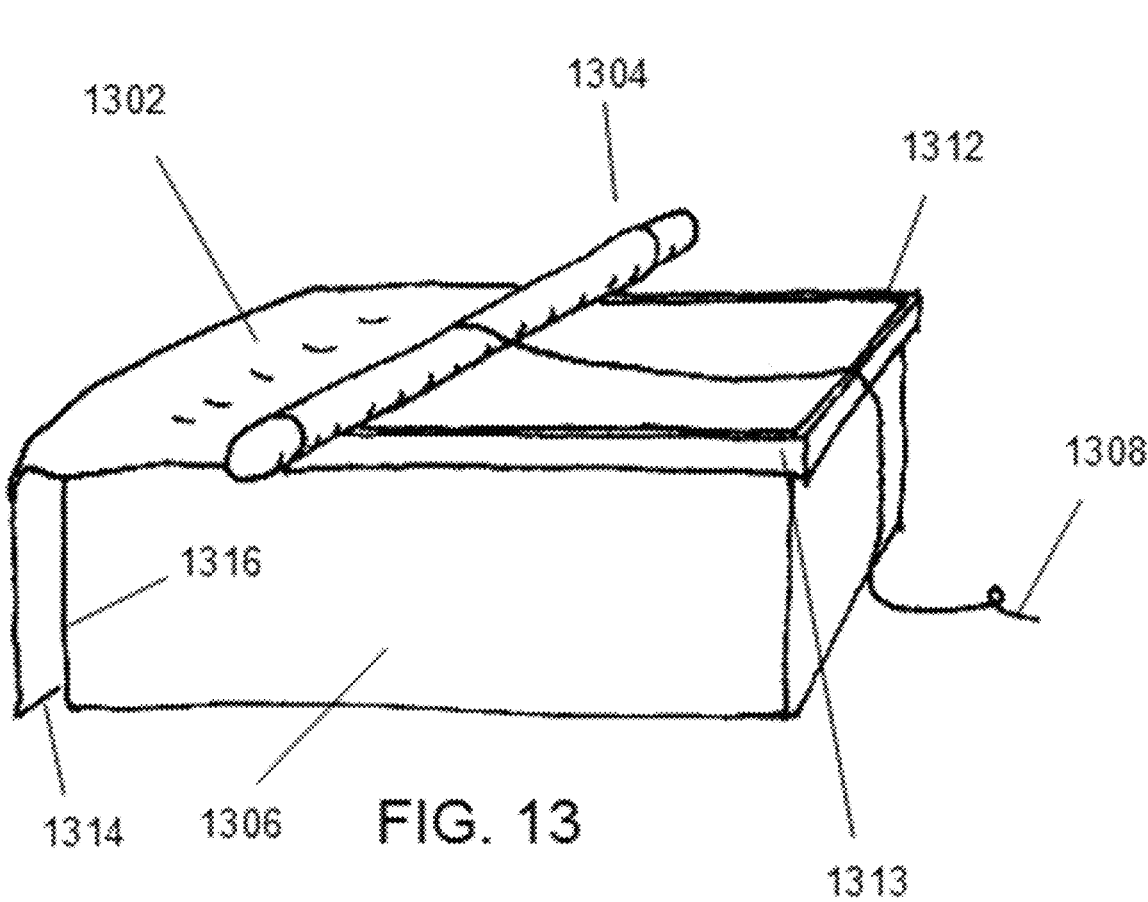

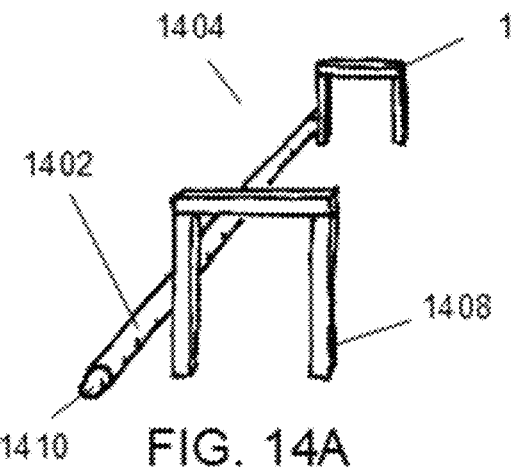
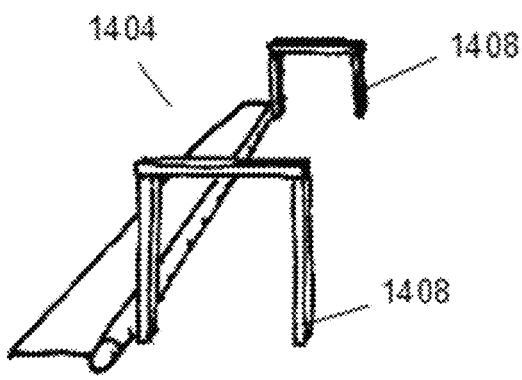
FIG. 14A    FIG. 14B
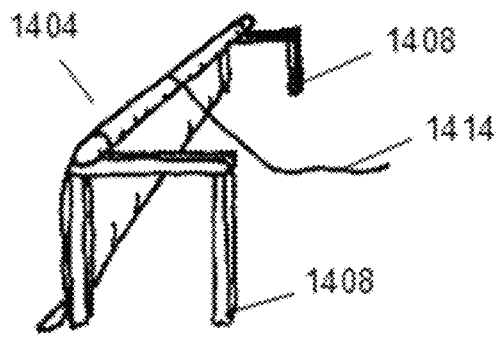
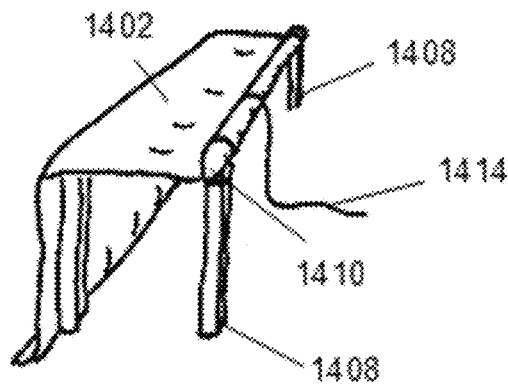
FIG. 14C    FIG. 14D
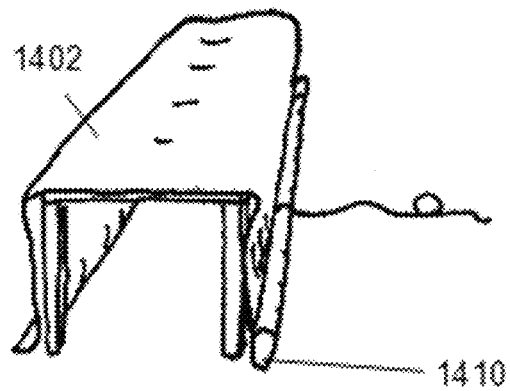
FIG. 14E

APPARATUS AND METHOD FOR STORING AND DEPLOYING SHEETS OF FLEXIBLE MATERIAL

FIELD

The disclosure relates to covering objects with a sheet of flexible material.

BACKGROUND

Covering objects with one or more sheets of flexible material is beneficial in many situations. These situations include, but are not limited to, concealing objects from view, preventing debris from escaping a container, creating an enclosed space around a building for fumigation, protecting an athletic field from rain, creating a temporary shelter, and protecting cargo on a flatbed.

When large objects are covered manually, the process is often strenuous and time-consuming and sometimes dangerous. For example, when the cargo on a flatbed trailer is protected with a tarp, the process involves a worker carrying a tarp atop the load, unrolling it lengthwise along the load, unfolding it widthwise across the load and then throwing the sides over the edge of the load before climbing back down to retrieve another tarp and repeating the process. When the load has sharp edges, blankets are first deployed over the load to protect the tarps. Tarping a flatbed in this way poses several challenges: at 10 to 14 feet above the ground, a fall from atop a loaded flatbed is likely to produce serious injury making solid footing important; with tarps frequently weighing over 80 pounds, solid footing is challenging; when cargo is irregularly shaped, solid footing is not guaranteed. When workers must tread on tarps that conceal gaps in the load or are wet due to rain or snow, solid footing becomes uncertain. For these reasons, tarping cargo on a flatbed is so strenuous, time-consuming and dangerous that many workers refuse to tarp loads manually and, for liability reasons, many shippers do not permit loads to be tarped at their facilities.

Various apparatus and associated methods are known to alleviate the danger and difficulty associated with manual tarping. In general terms, these approaches can be categorized into those that create a tarp enclosure, with an apparatus that is permanently attached to the tarp, and those that position the tarp over the load, with an apparatus that is releasably attached to the tarp.

Tarp enclosing systems for flatbeds, for example, U.S. Pat. No. 5,152,575 by DeMonte, comprise a tarp permanently affixed to a plurality of U-shaped bows that span the width of the flatbed and that travel the length the flatbed along a track. By moving the bows, the tarp enclosure can be extended over the load or collapsed, like an accordion, to either end of the flatbed. Such tarp enclosing systems enable cargo to be covered quickly, safely and with minimal effort. Besides being costly, the primary disadvantage of tarp enclosing systems is the limitation they place on the size and shape of cargo that can be transported. Flatbeds have the natural ability to haul cargo of virtually any size or shape. With rigid bows traveling on fixed tracks, a tarp enclosing system prevents a flatbed from transporting more lucrative oversize loads.

Another common method of tarp positioning involves hoisting a tarp overhead and subsequently lowering it onto a load. Such overhead tarping systems are sometimes fixed in a single location such as that disclosed in U.S. Pat. No. 6,502,709 by Parker. Such systems are large, expensive and require a substantial amount of dedicated space. Another style of overhead tarping apparatus attaches to a forklift such as that disclosed in U.S. Pat. No. 8,075,240 by Stevenson. While such systems are smaller, less expensive and do not require dedicated space they are still large enough that most flatbeds lack sufficient storage space to make them portable. Another disadvantage is that they require a forklift, without which they are non-operational. Yet another style of overhead tarping apparatus is designed to permanently attach to the trailer such as that disclosed in U.S. Pat. No. 10,569,625 by Munter. Similar to tarp enclosure systems, these systems have a rigid arch that travels on fixed rails thereby preventing the flatbed from transporting oversize loads.

A less common method of positioning a tarp on a load comprises dragging the tarp over the load. When such tarping systems are permanently attached to the trailer such as that disclosed in U.S. Pat. No. 10,569,625 by Munter, they prevent oversize loads. When such tarping systems are releasably attached to a forklift such as that disclosed in U.S. Pat. No. 7,182,387 by Hartman, they are too large to fit within the commonly available storage space on flatbed trailers. A further disadvantage of dragging a tarp over the cargo is that the tarp sometimes snags on the load thereby ripping or otherwise damaging the tarp.

Accordingly, there is a need for an inexpensive and portable tarping system that is capable of tarping oversize loads, is easy to use, deploys tarps quickly and is safe for both workers and tarps. More generally, such a system could would be generally useful in any situation where it is beneficial to cover an object with one or more sheets of flexible material.

SUMMARY

To at least partially overcome the disadvantages of known methods and apparatus to store and deploy a sheet or sheets of flexible material over large objects the disclosure provides an inflatable around which the sheet or sheets of flexible material, along with a cord or rope, can be quickly and easily furled. After deflating the inflatable, the furled tarp assembly can be rolled up and stored. The furled tarp assembly can be unrolled by inflating the inflatable within the furled tarp assembly. To cover the object, the furled tarp assembly is positioned near the top of the object being covered and the cord is pulled sharply, thereby rolling the inflatable over the object and unfurling the sheet and covering the object. The inflatable, having done its job, is then deflated, rolled up and stored until it is needed to furl and store the covering.

The disclosure provides a system, methods and apparatus for covering an object with a sheet of flexible material quickly, with minimal effort, and from the safety of the ground. In another aspect, methods are provided that quickly prepare a sheet of flexible material for storage with an apparatus that can be lightweight, inexpensive, and requires minimal storage space. In yet another aspect, apparatus and methods are provided for deploying a sheet of flexible material over an object that are operable independent of the size and shape of the object and independent of whether or not a forklift or other hoisting device is available.

In various examples, apparatus and methods for storing and deploying sheets of flexible material can be used in situations involving padding and tarps for open cargo vessels such as flatbed trucks, flatbed trailers, flatbed railcars, etc., tarps and mesh coverings for walled cargo vessels such as dump trucks, waste bins, storage containers, barges, etc., tarps and canvas for large objects such as buildings, structures, recreational vehicles, etc., tarps and other coverings for flat objects such as fields, rooftops, etc., and tarps and mesh coverings for gently sloped objects such as debris piles, roof tops, hills, etc.

In some examples, inflatables for use in the storage or deployment of a sheet of flexible material comprise one or more portions of non-porous pliable material arranged to define an interior surface, an exterior surface, and an interior volume, wherein the interior volume, when pressurized, causes the exterior surface to take on a prolate form, wherein the prolate form has an effective aspect ratio of at least 7.5. At least one valve is operable to permit or inhibit the flow of a gas into or out of the interior volume. In typical examples, multiple attachment points are situated on the external surface and extend along the length of the prolate form, wherein the multiple attachment points are suitable for attachment of a cord or the sheet of flexible material. One or more handles can be secured to the external surface. In some embodiments, a bladder is situated within the interior volume, wherein the valve is coupled to the bladder and wherein the form of the pressurized bladder is constrained by the one or more portions of non-porous pliable material. In other examples, substantially circular portions of material are provided, wherein the circular portions are secured to the one or more portions of non-porous pliable material and form the ends of the prolate form. The one or more portions of non-porous pliable material can be arranged in a lay-flat geometry and can be rectangular. In representative embodiments, the lay-flat geometry includes ends that are substantially arcuate. In some embodiments, the length of the prolate form is at least 10 ft, and the effective diameter of the prolate form is at least 1 ft and the valve is situated proximate at least one of the first and second ends of the inflatable. The non-porous pliable material can comprise a coated textile.

Systems for storing or deploying a sheet of flexible material comprise at least one inflatable as described above and a sheet of flexible material at least partially furled about the inflatable. In some examples, a pump is couplable to the valve on the at least one inflatable and a cord is furled together with the sheet of flexible material and is operable, when the at least one inflatable is pressurized, to roll the inflatable in a direction that unfurls the sheet of flexible material. In still further examples, multiple attachment points are situated along the length of the at least one inflatable, wherein the multiple attachment points are suitable for the attachment of a cord or the sheet of flexible material. In a representative example, a cord is secured to the at least one inflatable, wherein the cord is furled together with the sheet of flexible material and is operable, when the inflatable is pressurized, to roll the inflatable in a direction that unfurls the sheet of flexible material.

In other examples, a hoist is operable to lift the pressurized at least one inflatable to a height corresponding to the top of an object to be covered, wherein the hoist comprises a fork having one or more tines, each tine having a length greater than or equal to an effective radius of the at least one inflatable. In a specific example, the hoist is a forklift. In some examples, systems include one or more stop blocks securable to distal portions of the one or more tines. The one or more stop blocks can comprise at least one caster. The sheet of flexible material can include one or more flaps, and in some cases, a cord is attached to at least one of the one or more flaps.

In additional embodiments, the at least one inflatable is a first inflatable and a second inflatable, and portions of the sheet of flexible material are furled about each of the first inflatable and the second inflatable. The sheet of flexible material and the first and second inflatables form a roll with the first and second inflatables uninflated. The at least one valve can be a first valve associated with the first inflatable and a second valve associated with the second inflatable, wherein the first valve is situated at a first end of the first inflatable, the second valve is situated at a first end of the second inflatable, and the first ends are situated at a loose end of the roll formed by the furled sheet of flexible material and uninflated first and second inflatables.

Methods for covering an object with a sheet of flexible material comprise situating an inflatable having at least a portion of a sheet of flexible material furled about the inflatable proximate an object to be covered, the inflatable having, when pressurized, a prolate form with an effective aspect ratio of at least 7.5. The inflatable is pressurized with a gas and rolled so as to unfurl at least a portion of the sheet of flexible material onto at least a portion of the object to be covered. In some examples, a portion of the rolling is accomplished by pulling a cord furled together with the sheet of flexible material. In additional examples, a loose end of the sheet of flexible material is attached to a fixed object and the pressurized inflatable is lifted proximate the top of the object being covered with the forks of a hoisting mechanism, wherein a second portion of the rolling is accomplished by the lifting.

In representative embodiments, stop blocks are secured to the distal ends of the fork tines to inhibit the inflatable from rolling off the tines during the lifting and the pressurization of the inflatable acts to unroll the inflatable. In typical examples, the inflatable is situated above the object being covered before being pressurized. In further embodiments, situating the inflatable comprises situating a first inflatable having a first portion of a flexible material furled about the first inflatable and a second inflatable having a second portion of the sheet of flexible material furled about the second inflatable. The second inflatable is pressurized and rolled to at least partially unfurl the second portion of the sheet of flexible material onto at least a second portion of the object being covered. In representative examples, the rolling of the second inflatable is accomplished by pulling a cord furled together with the sheet of flexible material. In other representative examples, both the first and second pressurized inflatables are lifted proximate the top of the object being covered with the forks of a hoisting mechanism, wherein the rolling of the second inflatable includes rolling the inflatable off the forks and onto the object being covered. The first inflatable is lowered with the second inflatable still on the forks, wherein the unfurling of the first inflatable is accomplished by the lowering. Pressurization of the first and second inflatables is applied to cause the first and second inflatables to unroll, and in some examples, the first and second inflatables are situated above the object being covered before being pressurized.

Methods for storing a sheet of flexible material comprise spreading out the sheet of flexible material on a flat surface and situating an inflatable proximate an edge of the sheet of flexible material, wherein the inflatable, when pressurized, has a prolate form with an effective aspect ratio of at least 7.5. The inflatable is pressurized with a gas and rolled at least partially across the sheet of flexible material to furl at least a portion of the sheet of flexible material about the inflatable. The inflatable is then deflated, and the inflatable and the furled portion of the sheet of flexible material are rolled up. In representative embodiments, a cord is placed across the spread out sheet of flexible material such that the cord is furled together with the sheet of flexible material about the inflatable as the inflatable is rolled. An exterior surface of the inflatable can include multiple attachment points lengthwise and a cord or an edge of the sheet of flexible material can be secured to the inflatable with the multiple attachment points.

In representative examples, situating the inflatable comprise situating a first inflatable and a second inflatable proximate opposite edges of the sheet of flexible material, the first inflatable and the second inflatable having prolate forms with an effective aspect ratio of at least 7.5 when pressurized. The second inflatable is pressurized with a gas and rolled at least partially across the sheet of flexible material and towards the first inflatable so as to furl at least a second portion of the sheet of flexible material about the second inflatable. The second inflatable is deflated and the second inflatable and at least the second portion of the sheet of flexible material are rolled up. A cord can be placed about the first and second inflatables after the sheet of flexible material is at least partially furled such that first and second inflatables are secured in a position proximate one another. A cord can be placed across the spread out sheet of flexible material such that the cord is furled about either the first or second inflatable when rolled.

The foregoing and other objects, features, and advantages of the disclosure will become more apparent from the following detailed description, which proceeds with reference to the accompanying drawings.

BRIEF DESCRIPTION OF THE DRAWINGS

FIGS. 3A-3G illustrate how flatbed tarps are currently folded and rolled up;

FIGS. 7BB-7CC are sectional views of the inflatable of FIG. 7B;

FIGS. 9A-9F illustrate positioning of a tarp over a loaded flatbed;

FIGS. 12A-12B illustrate positioning of a tarp over a flat or gently sloped object;

FIG. 13 illustrates positioning a tarp over a walled container;

FIGS. 14A-14E illustrate positioning of a tarp over a structure to create a covered space;

DETAILED DESCRIPTION

Figure 1:
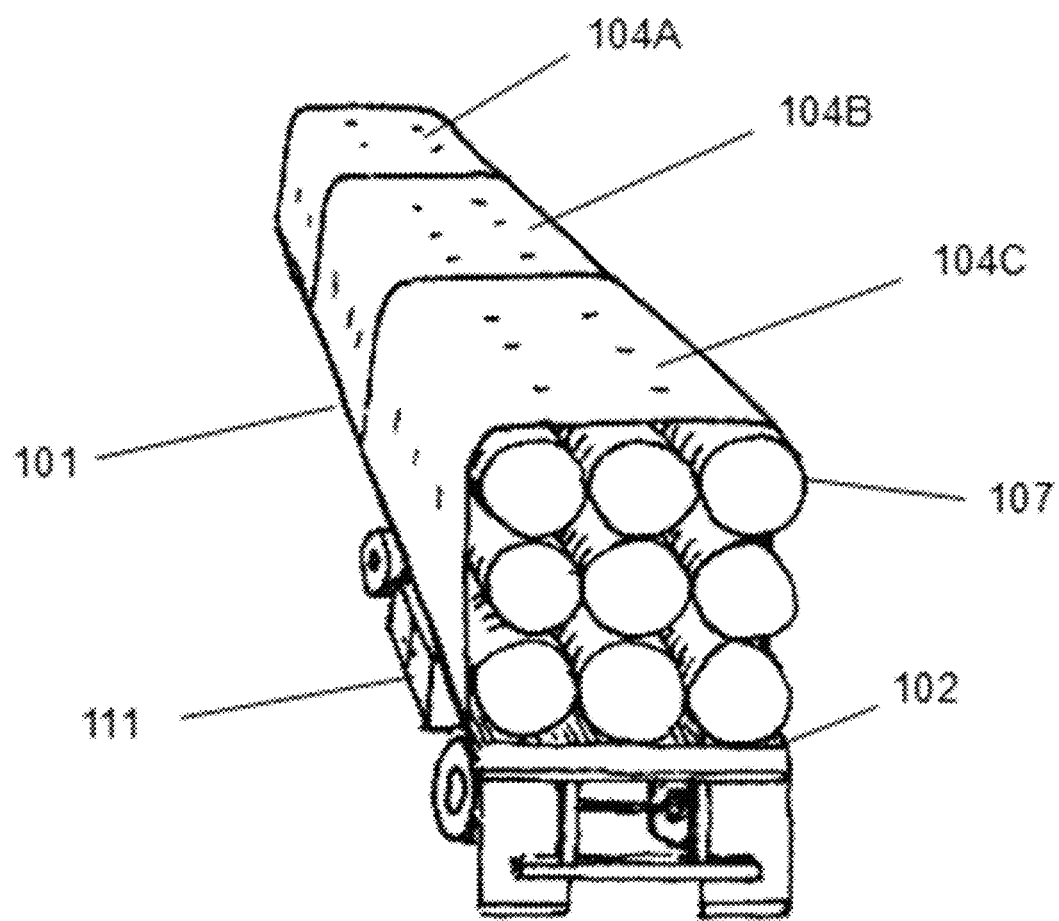
FIG. 1 illustrates a loaded flatbed with tarps covering cargo.

FIG. 1 illustrates a flatbed trailer 101 with cargo 107 that is situated on a trailer deck 102 and is covered with tarps 104A-104C. A standard flatbed trailer is 48 feet in length and has deck that is 8.5 feet wide and 60 inches off the ground. The tarps 104A-104C are sufficient length to provide some overlap between adjacent tarps, typically 1 to 3 feet of overlap for a standard trailer. Tarp dimensions are frequently specified with reference to a length (along the length of flatbed trailer 101) and a width (across the width of flatbed trailer 101) or alternatively by a length and a drop. A drop is the maximum cargo height a tarp can cover. For example, a tarp with a 6 foot drop corresponds to a 20 foot width and a tarp with an 8 foot drop corresponds to a 24 foot width for the standard 8.5 ft deck width.

The tarps 104A-104C can be secured to the flatbed trailer 101 with bungee cords or ropes using a rub rail (not shown). When not in use, the tarps 104A-104C can be stored in a tarp box 111.

Figures 2A, 2B:
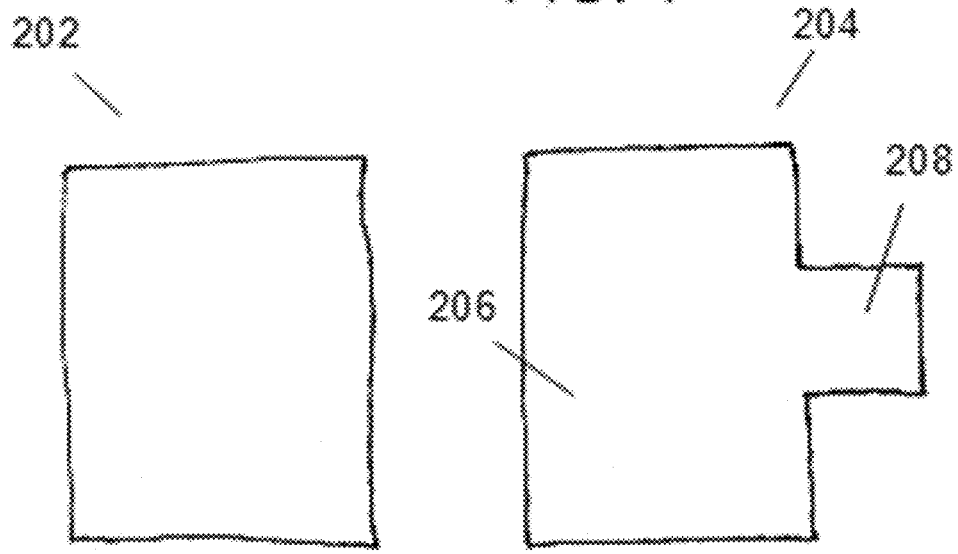
FIGS. 2A-2B illustrate two styles of tarps.

FIGS. 2A-2B illustrate tarps 202, 204 that can be used to cover cargo or other objects. Referring to FIG. 2A, the tarp 202 is a rectangular tarp (commonly referred to as a steel tarp) and tarp 204 (commonly referred to as a lumber tarp) includes a rectangular section 206 and a flap 208.

A method used to prepare a tarp 300 for storage comprises the steps of folding, rolling up and securing as illustrated in FIGS. 3A-3G. In a first step (FIG. 3A), the tarp 300 is spread out on ground and, if it is a lumber tarp, a flap 302 is folded onto a main portion 304 of the tarp 300. In a second step, lengthwise edges 303 & 305 are folded in to a widthwise center line 308 of the tarp 300 creating folds 313 & 315 (FIG. 3B). In a third step, the folds 313 & 315 are folded toward the center line 308 creating folds 323 & 325 (FIG. 3C). In a fourth step, fold 325 is folded over the centerline 308 and onto the fold 323 (FIG. 3D). In a final folding step, edge 316 is folded partway up towards edge 317 creating fold 320 (FIG. 3E). Starting from the fold 320, the tarp 300 is rolled up (FIG. 3F) and then secured with bungee cords 322, 324 as shown in FIG. 3G. Folded and rolled up in this manner, the tarp 300 can be stored compactly, for example in the tarp box 111 of FIG. 1.

Figure 4:
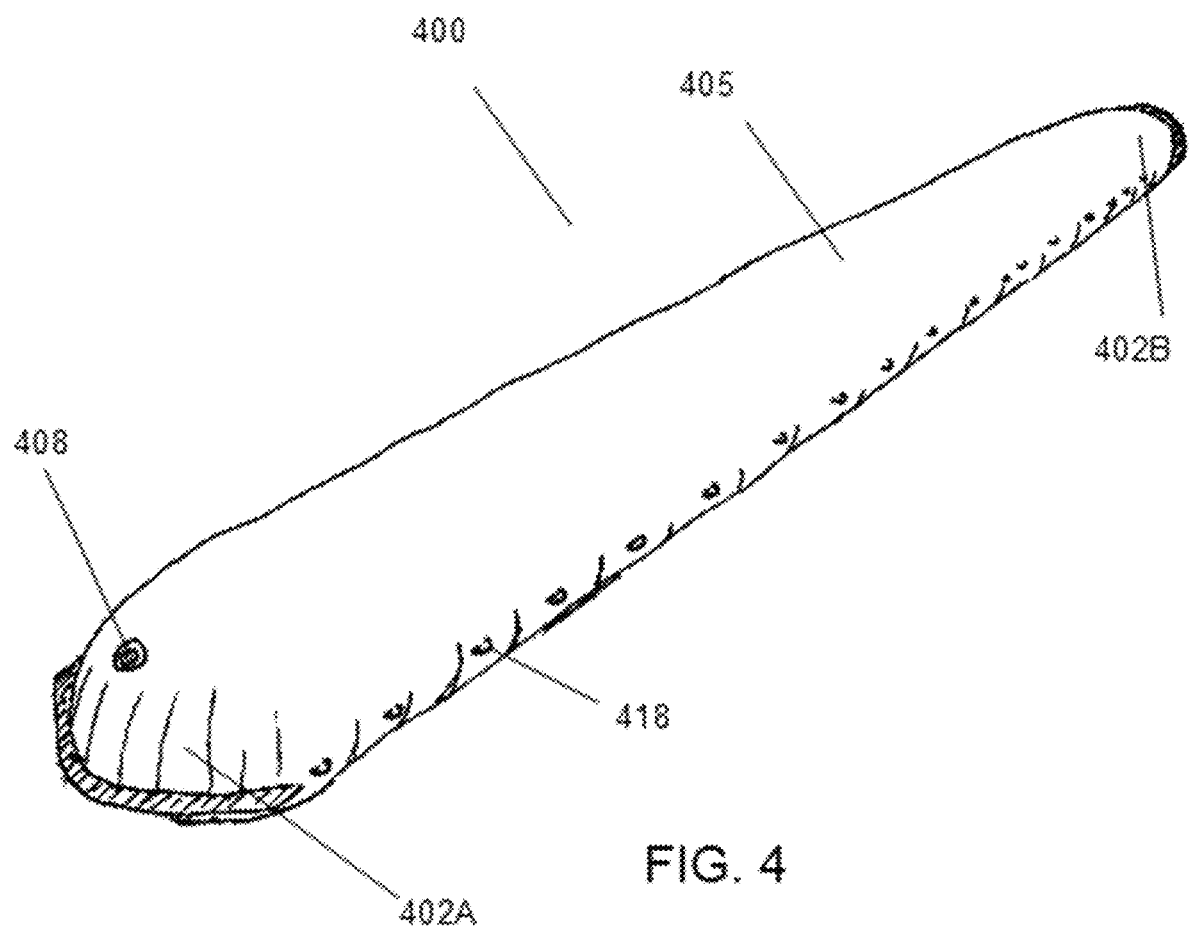
FIG. 4 illustrates a representative inflatable.

Referring to FIG. 4, a representative inflatable 400 is formed of one or more portions 405 of a material. The pressurized inflatable has a prolate form with ends 402A, 402B that can have the form of partial ovoids, spheroids, ellipsoids, or other curved or angular shapes. A valve 408 is situated proximate the end 402A and is operable to permit or inhibit the flow of gas into or out of the inflatable. A plurality of attachment points 418 can be provided along the lengthwise axis of the prolate form. The attachment points, for example, d-rings, can be used to secure a cord or a sheet of flexible material to the inflatable 400.

FIG. 5A-5F illustrate the use of an inflatable 500 to prepare a tarp 502 for storage. Use of the inflatable 500 replaces the folding steps illustrated in FIG. 3B-3E with a single furling step. The inflatable 500 has ends 504A, 504B with a valve 508 situated proximate the end 504B and, when pressurized, has a prolate form that is substantially cylindrical along its length. Handles can be included to assist in manual lifting but are not shown. A plurality of attachment points 518 can be situated along the length of the inflatable 500.

Figure 5A:
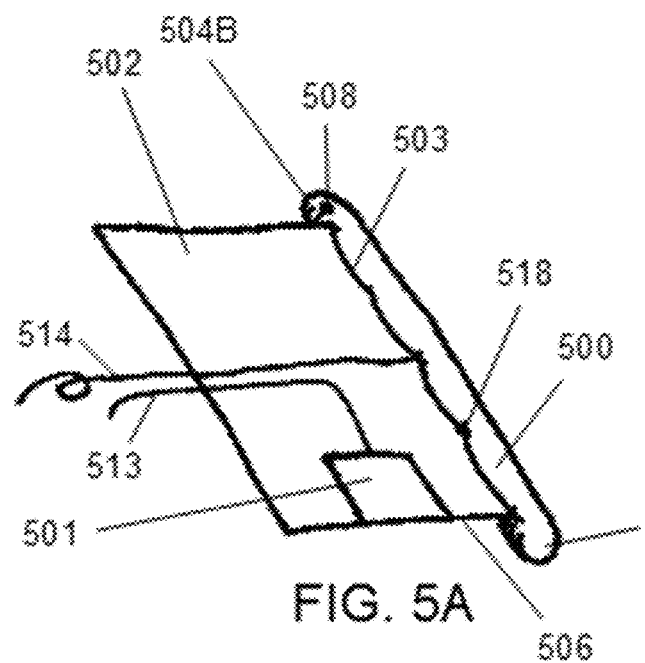
FIGS. 5A-5F illustrate using an inflatable such as illustrated in FIG. 4 to furl and roll up a sheet of flexible material.
Figure 5B:
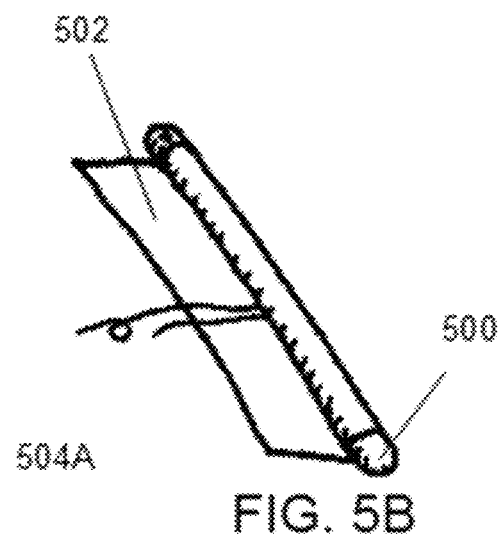
Figure 5C:
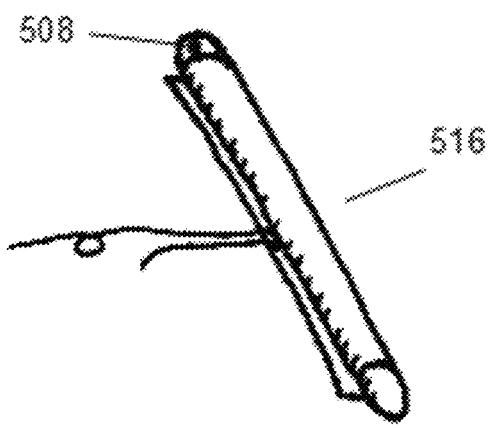
Figure 5D:
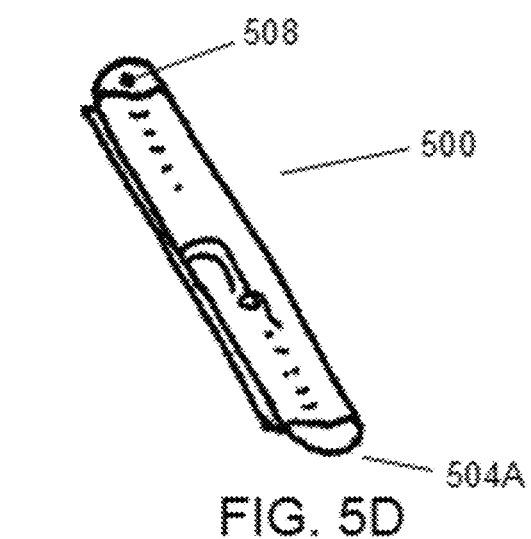
Figure 5E:
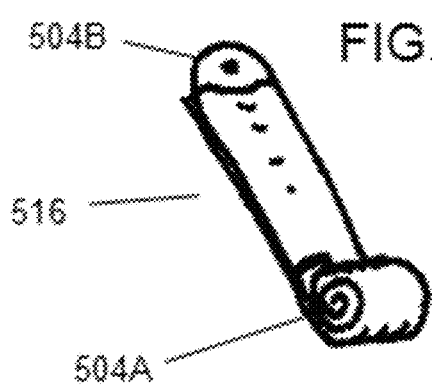
Figure 5F:
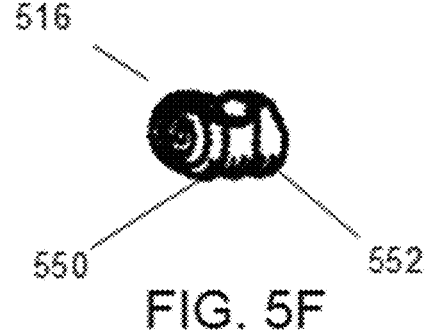

The tarp 502 has a flap 501 that has been folded along a widthwise edge 506 onto the main portion of tarp 502. A cord 513, attached to flap 501, is operable during deployment to pull the flap 501 from the top of the object being covered thereby covering a third side. In FIG. 5A the inflatable 500 is pressurized and releasably attached to a lengthwise edge 503 of the tarp 502 using attachment points 518. While it is not necessary to attach the tarp 502 to the inflatable 500 it is sometimes convenient to do so. A cord 514 is positioned widthwise across the tarp 502 and can have both ends free or have one end releasably or permanently attached to inflatable 500. The tarp 502 is then furled (FIG. 5B) about the inflatable 500 by, for example, rolling the inflatable 500 across the tarp 502 to form a furled tarp assembly 516 (FIG. 5C). The valve 508 is then opened and the inflatable 500 is deflated (FIG. 5D). Starting at the end 504A the furled tarp assembly 516 is rolled up (FIG. 5E). The rolled up, furled tarp assembly 516 is then secured with straps or cords 550, 552 (FIG. 5F) and is ready for storage.

Figure 6A:
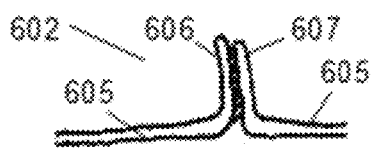
FIGS. 6A-6B illustrate fabric welds that can be used in inflatables.
Figure 6B:
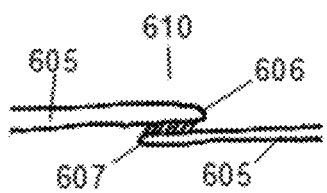

Many known materials and fabrication technologies are suitable for the manufacture of inflatables such as inflatables 400, 500 discussed above. Without implying preference or limiting the field of viable materials or fabrication technologies, various embodiments are described. An inflatable is generally fabricated using a non-porous, pliable material, for example an 18 ounce PVC coated polyester fabric, whose edges are joined to create a pressurizable internal volume. If using such a fabric 605, edges 606, 607 can be joined by sewing, gluing, or welding as illustrated in FIGS. 6A-6B. If the edges are sewn together, an internal bladder may be required to achieve the desired degree of airtightness. If the edges are glued or welded, the desired degree of airtightness can typically be achieved without an internal bladder. Two common weld joints are a fin weld 602 and a lap weld 610. When used in the fabrication of an inflatable, a fin weld 602 experiences a peel stress concentrated in a small portion of the weld and is therefore generally not as strong as a lap weld 610 that experiences a shear stress that is more uniformly distributed over the weld.

Figure 7A:
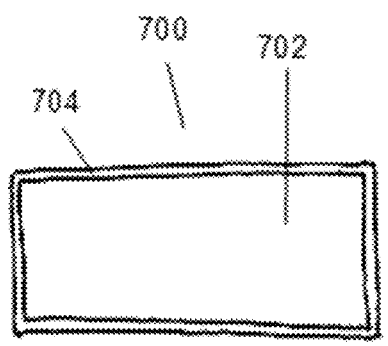
FIGS. 7A-7F illustrate various embodiments of an inflatable, as inflated and deflated.
Figure 7B:
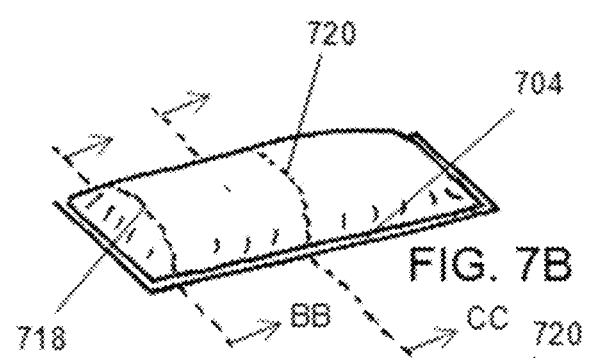

To aid in the rolling performed during furling and unfurling, it is sometimes advantageous for the pressurized form of an inflatable to be substantially cylindrical. To aid in rolling up, it is advantageous for an inflatable to lay flat when deflated. An inflatable 700, fabricated from two identical rectangular pieces of fabric 702 joined with fin welds 704 along the edges lays flat when deflated as shown in FIG. 7A. The pressurized form of inflatable 700 (FIG. 7B) has a cross section 720 that is substantially circular near the midsection and a cross section 718 that is highly ovate near the end as shown in FIGS. 7BB and 7CC. While the inflatable 700 is fully functional, the lack of uniformity in cross section along its length and the protuberances caused by the lengthwise fin welds 704 limit the smoothness with which it can roll.

Figures 7B, 7C:
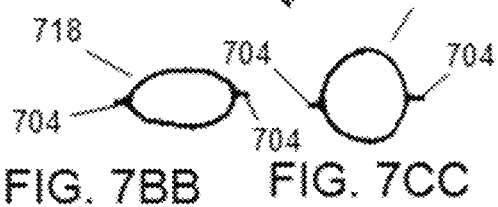
Figure 7C:
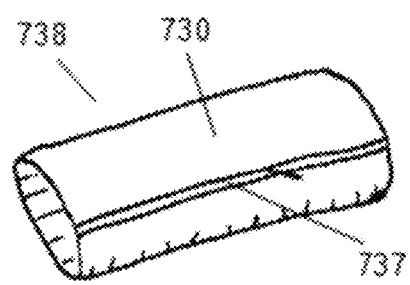
Figure 7D:
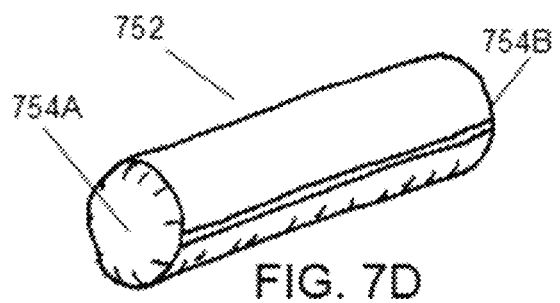
Figure 7E:
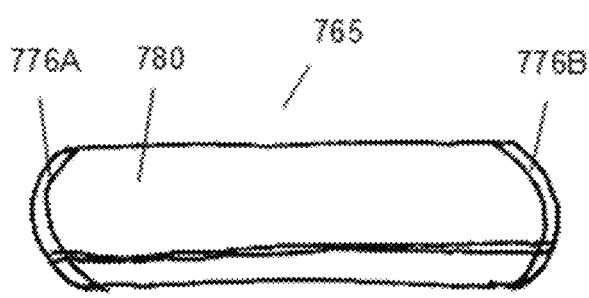
Figure 7F:

The protuberances caused by the lengthwise fin welds 704 can be eliminated by starting with a piece of fabric 730 that is welded into a tube 738 with a lengthwise lap weld 737 (FIG. 7C). Further, the non-uniformity in lengthwise cross section can be eliminated by fabricating an inflatable 752 with circular end caps 754A, 754B (FIG. 7D). The resulting inflatable rolls smoothly when pressurized but does not lay flat when deflated. In another example an inflatable 765 is fabricated by sealing a tube 780 with curved fin welds 776A, 776B. The inflatable 765 lays flat when deflated (FIG. 7E) and when pressurized has a substantially uniform circular cross-section along its length (FIG. 7F).

Figure 8A:
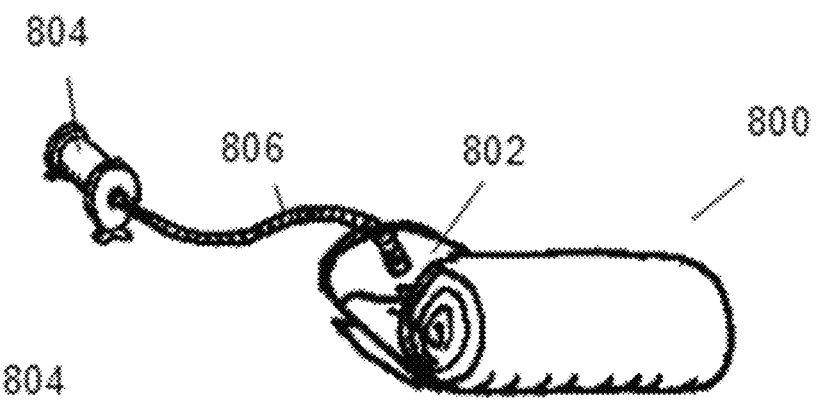
FIGS. 8A-8C illustrate the use of inflation to unroll a rolled up furled tarp assembly.
Figure 8B:
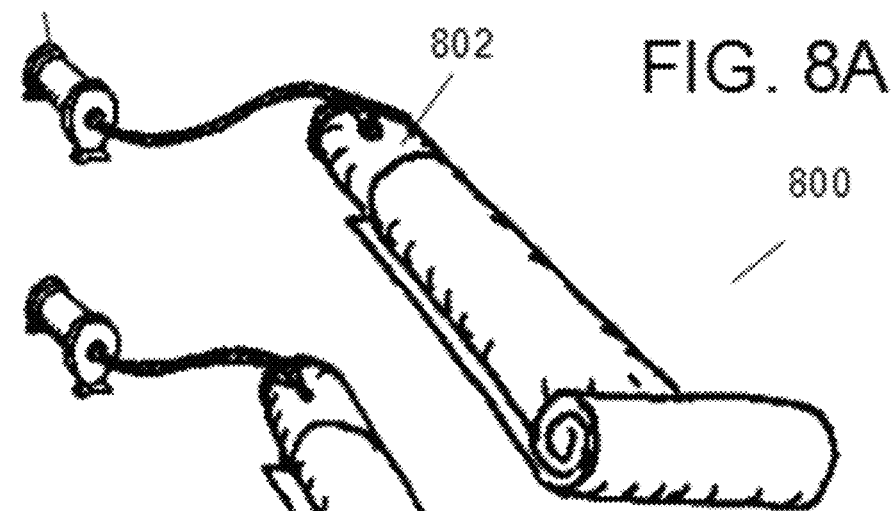
Figure 8C:
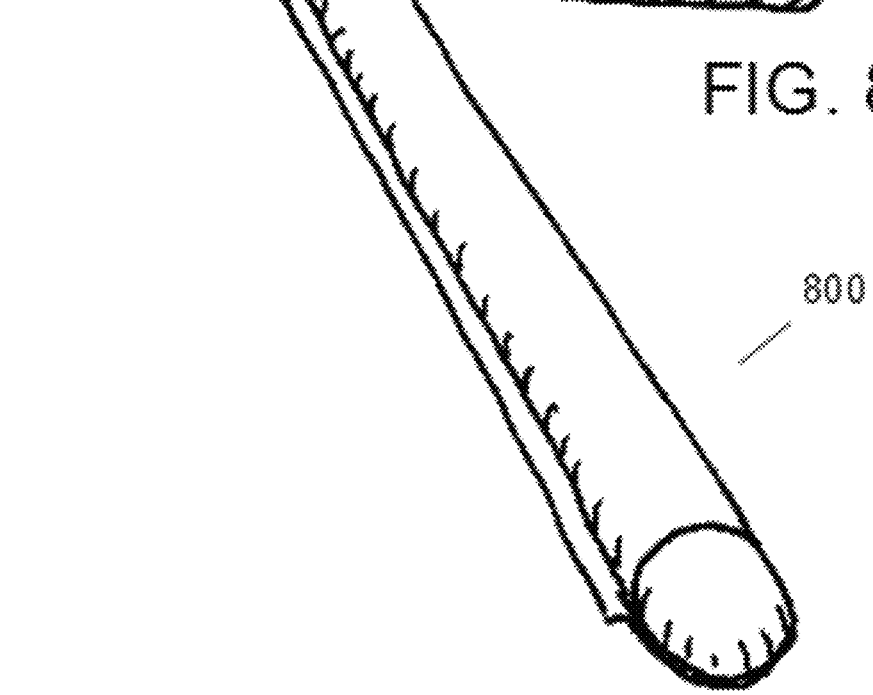

A pump 804 can be coupled to an inflatable 802 in a furled tarp assembly 800 that is rolled up using a hose 806 (FIG. 8A). When the pump 804 is turned on the pressure in the inflatable 802 begins to unroll the furled tarp assembly 800 (FIG. 8B). Once the inflatable 802 is fully pressurized, the furled tarp assembly 800 is fully unrolled and ready for deployment (FIG. 8C).

A furled tarp assembly 904 with a fully pressurized inflatable 903 can be placed on a fork 908 of a forklift 900 and positioned proximate an object to be covered, in this case cargo 906 on a flatbed 912 (FIG. 9A). Once the forklift 900 has lifted the furled tarp assembly 904 to nominally the same height as a rub rail 918A, a cord 914 furled with tarp 902 about inflatable 903 is thrown up and over the cargo 906 and the loose end 916 of the tarp 902 is secured to a rub rail 918A. As the forklift 900 then lifts the tarp assembly 904 to the top of the cargo 906, tarp 902 begins unfurling because its loose end 916 is secured to the rub rail 918A (FIG. 9C). The cord 914 is then pulled and tarp 902 further unfurls onto cargo 906 as inflatable 903 rolls off fork 908 and across cargo 906 (FIG. 9D). As inflatable 903 continues rolling over and down the cargo 906, the tarp 902 is fully unfurled onto the cargo 906 (FIG. 9E). The cord 914 and the inflatable 903 are detached from the tarp 902 and the tarp 902 is secured to a rub rail 918B. The inflatable 903 can be subsequently deflated, rolled up and stored. While FIGS. 9A-9F show a forklift, other hoisting mechanisms may also be used.

Figure 10A:
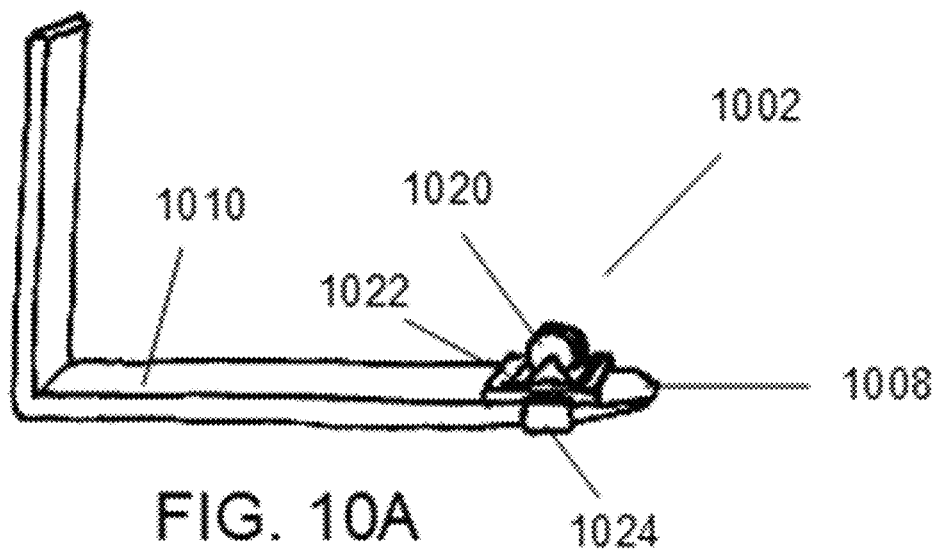
FIGS. 10A-10C illustrate representative stop blocks that can be used on fork tines while lifting.
Figure 10B:
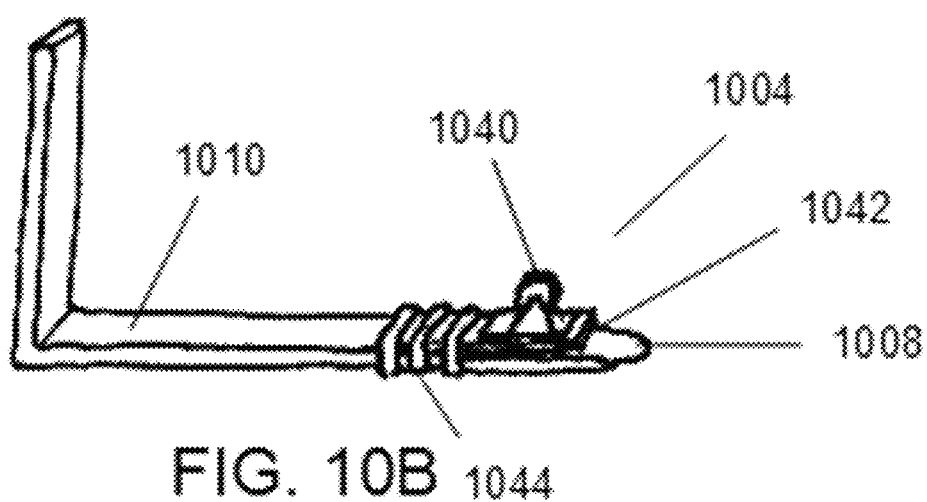
Figure 10C:
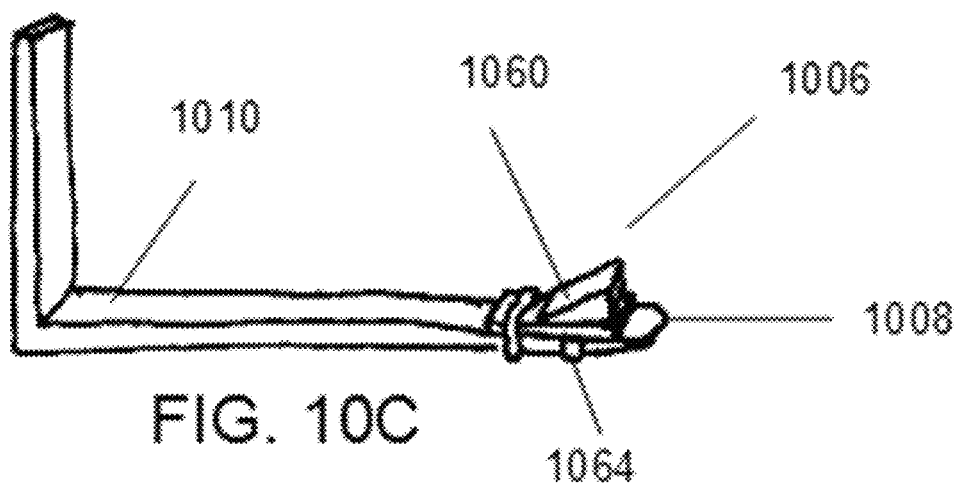

As shown in FIGS. 10A-10C, stop blocks 1002, 1004, 1006 are operable to prevent a furled tarp assembly from rolling off the fork tines when it is being lifted. They must also be operable to allow a furled tarp assembly to roll off the fork tines when the cord furled together with the tarp is pulled. The stop blocks are secured to an end 1008 of a representative tine 1010 of a forklift fork. The stop block 1002 includes a caster 1020 that is secured to a base 1022 that can be removably fixed to the tine 1010 with a strap 1024. The stop block 1004 includes a caster 1040 that is secured to a base 1042 that extends along the tine 1010 and can be removably fixed to the tine 1010 with one or more straps 1044. The stop block 1006 includes a triangular block 1060 that can be removably secured to the tine with a strap 1064, or otherwise removably secured.

Figure 11A:
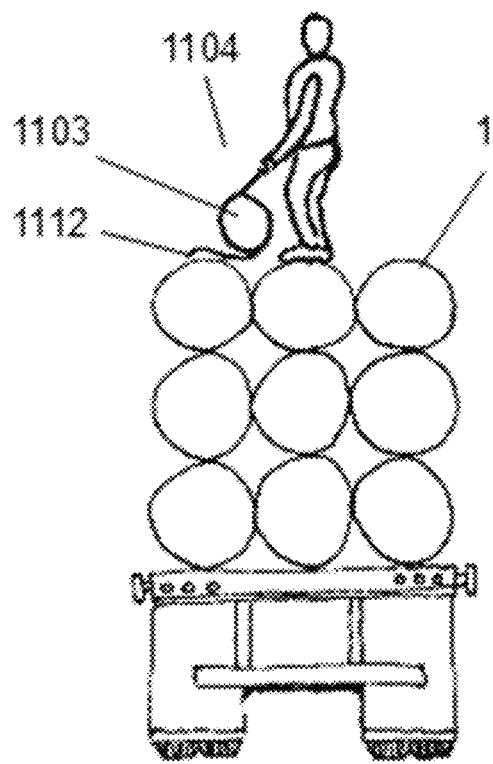
FIGS. 11A-11D illustrate positioning of a tarp over a loaded flatbed.
Figure 11B:
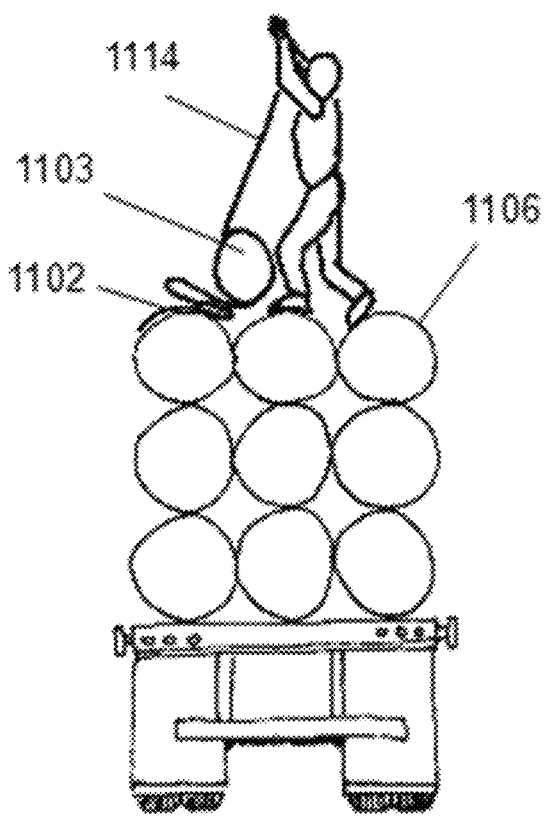
Figure 11C:
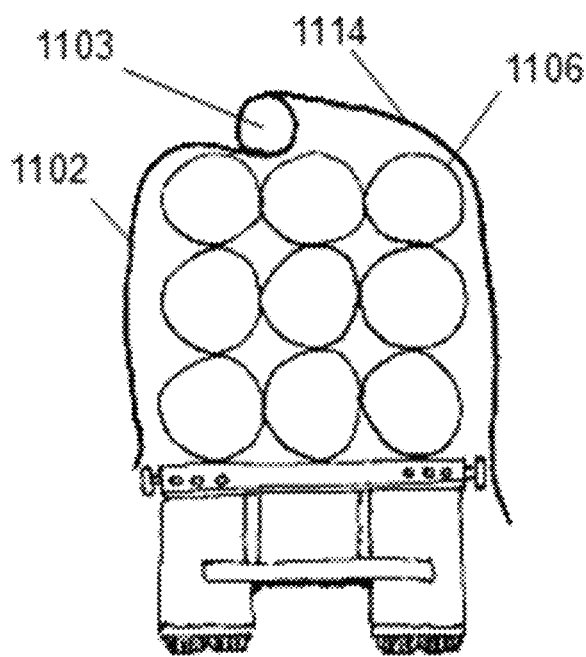
Figure 11D:
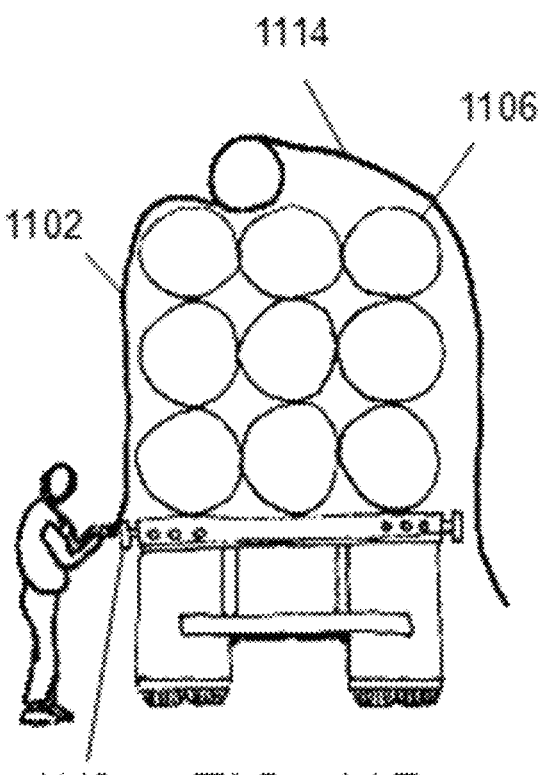

In some cases, a worker carries the furled tarp assembly 1104 atop cargo 1106 and pressurizes inflatable 1103 from there. The inflatable 1103, now pressurized, extends along the length of the cargo 1106 and the tarp 1102 is ready to be deployed. The worker, standing near a center of the cargo 1106 with a loose end 1112 of tarp 1102 paying out from a bottom side of the furled tarp assembly 1104 and toward the edge of cargo 1106 (FIG. 11A), takes hold of a cord 1114 and pulls it directly upward thereby unfurling a portion of the tarp 1102 corresponding to the height of the cargo 1106 (FIG. 11B). The worker throws the unfurled portion of the tarp 1102 over edge of cargo 1106 and throws the cord 1114 over the opposite edge (FIG. 11C). The worker then descends from atop the cargo 1106, and secures the unfurled portion of the tarp 1102 to a rub rail 1142. The worker then performs steps such as those illustrated in FIGS. 9D-9F to complete the positioning of the tarp 1102 on the cargo 1106.

FIGS. 12A-12B illustrate the deployment of a tarp 1202 of an inflated furled tarp assembly 1204 over a flat or gently sloped surface, for example a playing field. When the furled tarp assembly 1204 is large or heavy, a vehicle or additional personnel can be used for unfurling. A similar method may be used to cover a shallow hill or a debris pile. If needed, one person can push on the furled tarp assembly 1204 while another simultaneously pulls on the cord 1206.

As shown in FIG. 13, a tarp 1302 can be unfurled from a furled tarp assembly 1304 to cover a walled container 1306, for example a dump truck, dumpster, barge, or the like. The furled tarp assembly 1304 is positioned atop opposing walls 1312, 1313 of the walled container 1306. A loose end 1314 of the tarp 1302 is secured to an adjacent wall 1316 and a cord 1308 is pulled to unfurl the tarp 1302 over the walled container 1306.

A covered space can be created by positioning tarp 1402 over two u-shaped members 1408 as shown in FIGS. 14A-14E. An inflatable 1410 is pressurized and a furled tarp assembly 1404 is positioned adjacent members 1408 that are secured to the ground (FIG. 14A). The furled tarp assembly 1404 is partially unfurled on the ground (FIG. 14B) and then lifted atop the members 1408 (FIG. 14C). A cord 1414 is pulled to roll the inflatable 1410 across the members 1408 thereby unfurling the tarp 1402 (FIG. 14D). Once inflatable 1410 has fully traversed the members 1408 the inflatable 1410 falls down the far side completing the unfurling of the tarp 1402 and creating the covered space (FIG. 14E).

Figure 15A:
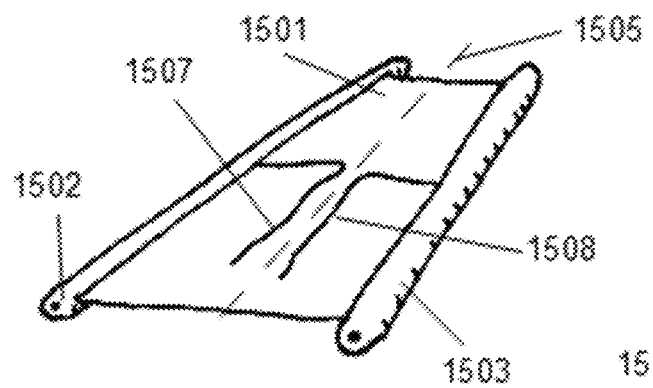
FIGS. 15A-15F illustrate furling and rolling up of a tarp using two inflatables.
Figure 15B:
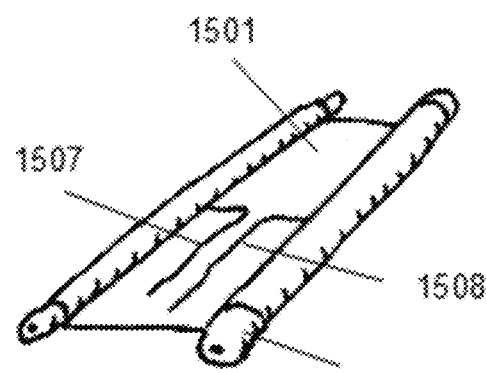
Figure 15C:
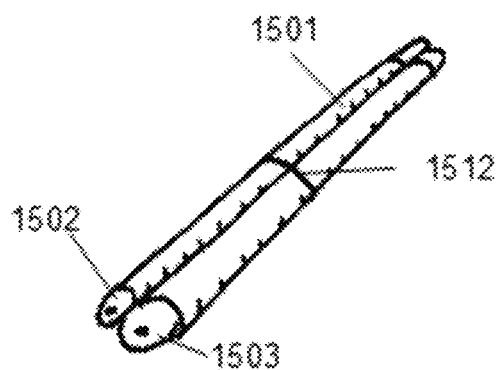
Figure 15D:
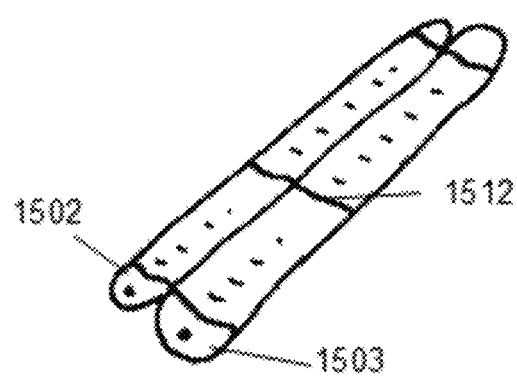
Figure 15E:
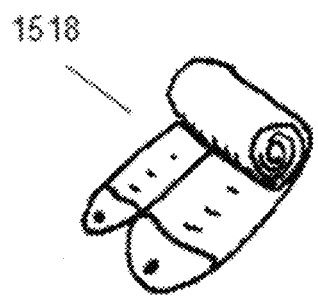
Figure 15F:
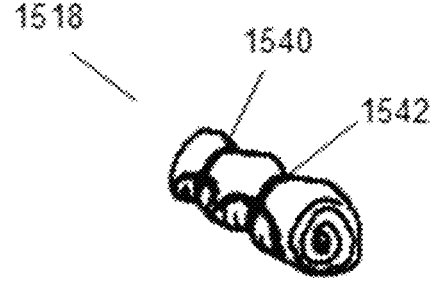

A tarp 1501 can be furled and rolled up with two inflatables 1502, 1503 that have substantially the same length and in some cases have the same diameter and in other cases have a different diameter as shown in FIGS. 15A-15F. After pressurizing the inflatables 1502, 1503 they are positioned alongside lengthwise edges of a tarp 1501. In some cases, the inflatables 1502, 1503 are releasably attached to the tarp 1501. In other cases, inflatables 1502, 1503 are permanently attached to the tarp 1501. In some cases, cords 1507, 1508 are used and can be either unattached, releasably attached or permanently attached to the inflatables 1502, 1503 respectively. As the inflatables 1502, 1503 are rolled toward the centerline 1505, the tarp 1501 is furled onto them, the portion of the tarp 1501 on each inflatable being determined by how far each one is rolled. In some cases, after the tarp 1501 is fully furled onto the inflatables 1502, 1503, a cord 1512 is used to secure the inflatables 1502, 1503 adjacent to one another (FIG. 15C). The inflatables 1502, 1503 are then deflated (FIG. 15D) to produce a deflated, double furled tarp assembly 1518 that is rolled up (FIG. 15E) and secured with bungee cords 1540, 1542 and ready for storage (FIG. 15F).

Figure 16A:
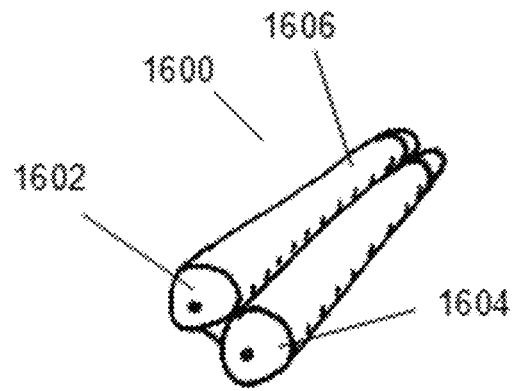
FIGS. 16A-16F furling and rolling up of a tarp using two inflatables.
Figure 16B:
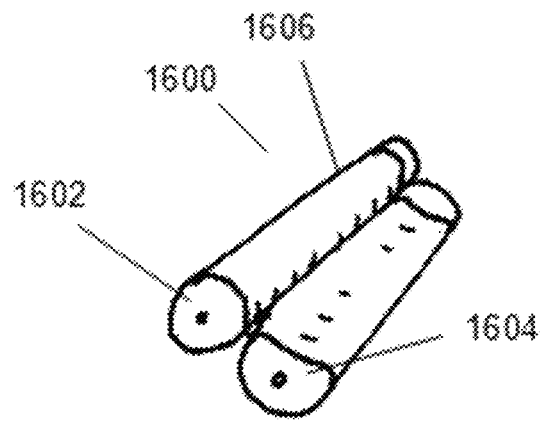
Figure 16C:
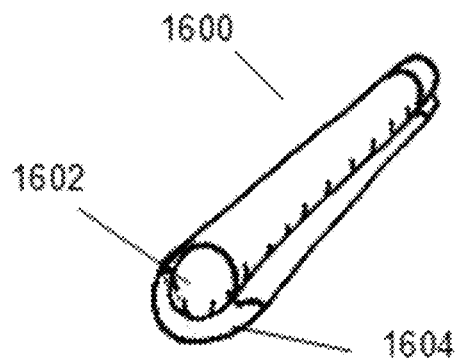
Figure 16D:
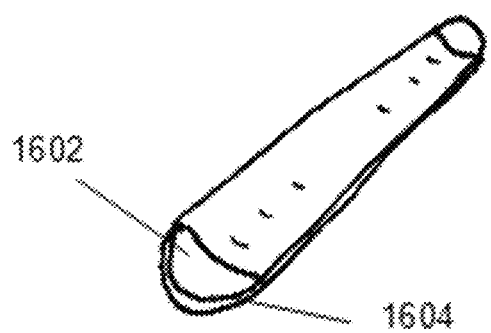
Figure 16E:
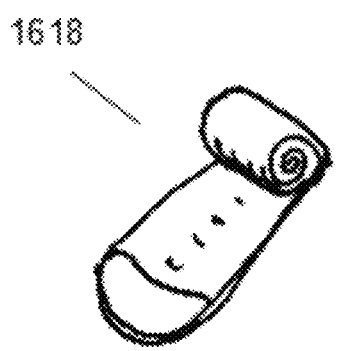
Figure 16F:
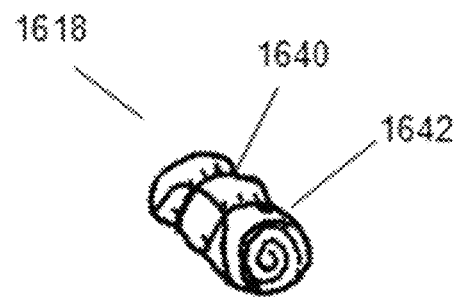

Referring to FIGS. 16A-16F, a tarp assembly 1600 includes a first inflatable 1602 and a second inflatable 1604 and a tarp 1606 that is partially furled onto each. The second inflatable 1604 is deflated (FIG. 16B) and then the first inflatable 1602 and the associated furled tarp portion are positioned on top of the second inflatable 1604 (FIG. 16C). The first inflatable 1602 is deflated (FIG. 16D) and the assembly is rolled (FIG. 16E) to produce the rolled assembly 1618. Finally, the rolled assembly 1618 is secured with straps 1640, 1642 (FIG. 16F).

Figure 17A:
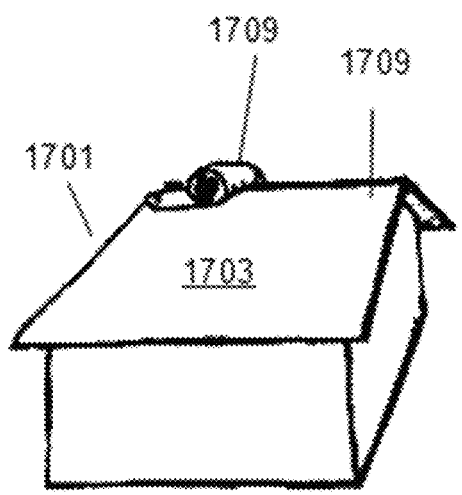
FIGS. 17A-17D illustrate positioning of a tarp to tent a building for fumigation.
Figure 17B:
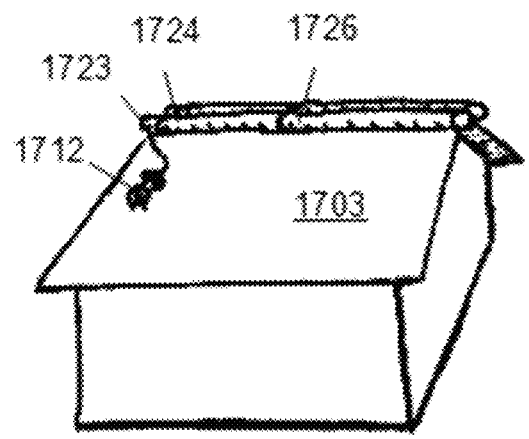
Figure 17C:
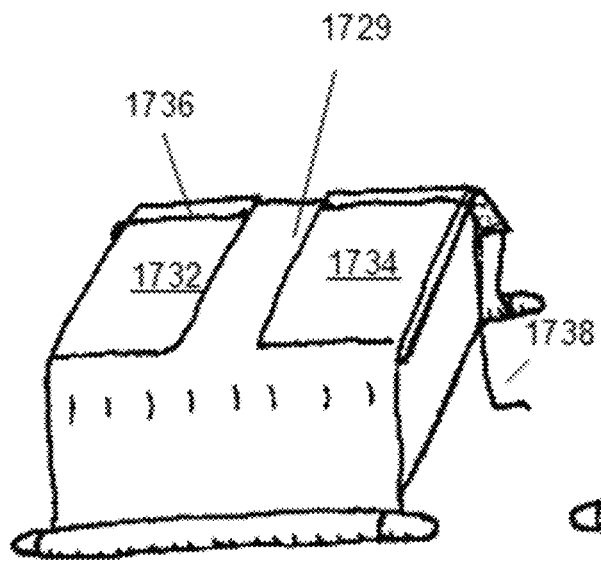
Figure 17D:
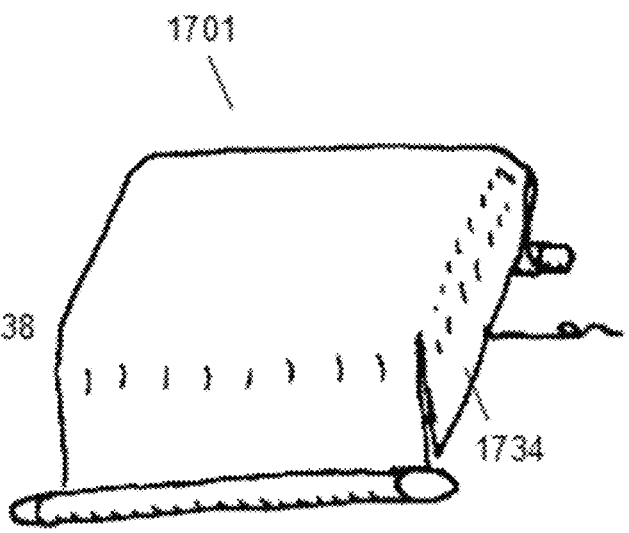

When buildings are fumigated, they are first tented in a process that involves covering the entire building with sheets of flexible material and subsequently securing the sheets to one another. Use of furled tarp assemblies for this application is illustrated in FIGS. 17A-17E. A double furled tarp assembly 1709 is positioned along the ridge of a roof 1703 of a building 1701 roof (FIG. 17A) and inflatables 1723, 1724 are pressurized with a pump 1712 (FIG. 17B). Once the inflatables 1723, 1724 are fully pressurized (FIG. 17B), a cord 1726 that releasably fastens inflatables 1723 and 1724 adjacent to one another is released and the inflatables 1723, 1724 roll down the roof 1703 in opposing directions, thereby unfurling the tarp 1729 and exposing the flaps 1732, 1734 (FIG. 17C). Pulling cords 1736, 1738 deploys the flaps and completes the process of covering the building 1701.

In methods such as those illustrated in FIGS. 11, 12 and 17, the inflatable does not need to be stiff enough to support its own weight. For this reason, these methods require less internal pressure thereby reducing the amount of time required to fully pressurize the inflatable and permitting use of inflatables that are suitable for low pressures.

Figure 18A:
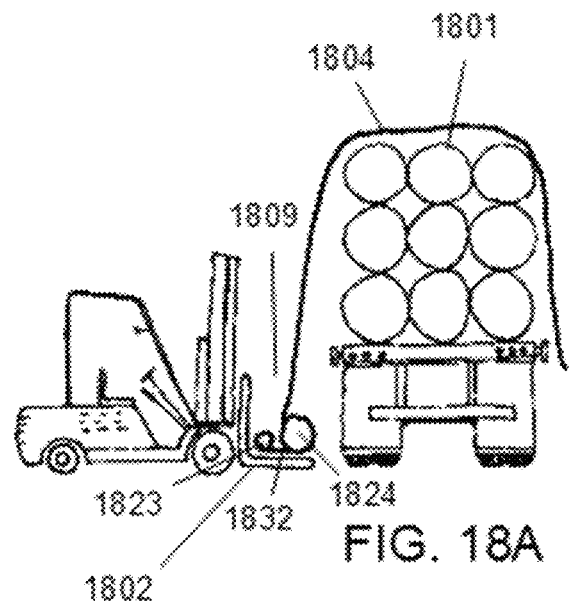
FIGS. 18A-18D illustrate positioning of a tarp over a loaded flatbed.
Figure 18B:
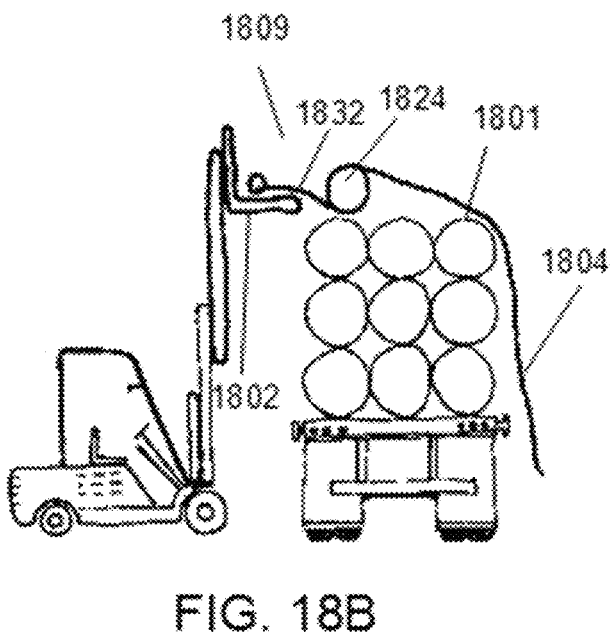
Figure 18C:
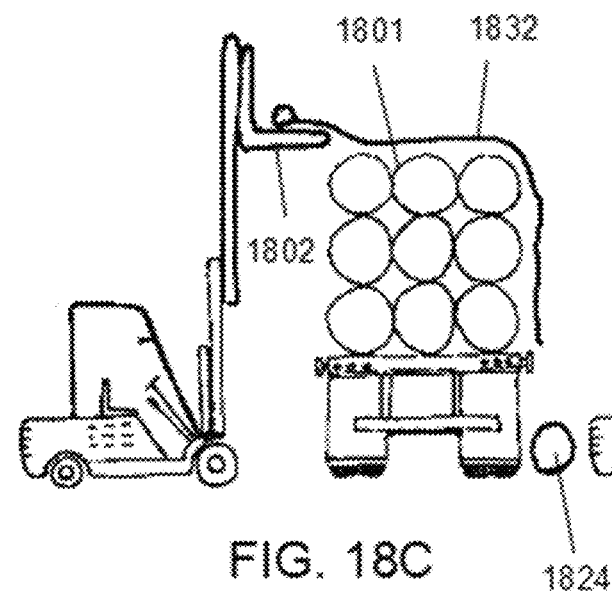
Figure 18D:
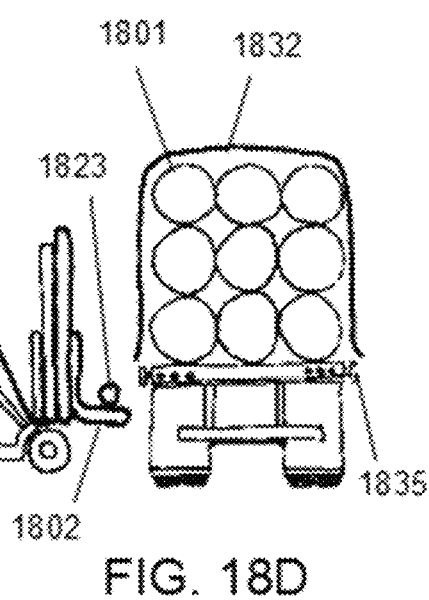
Figure 19:
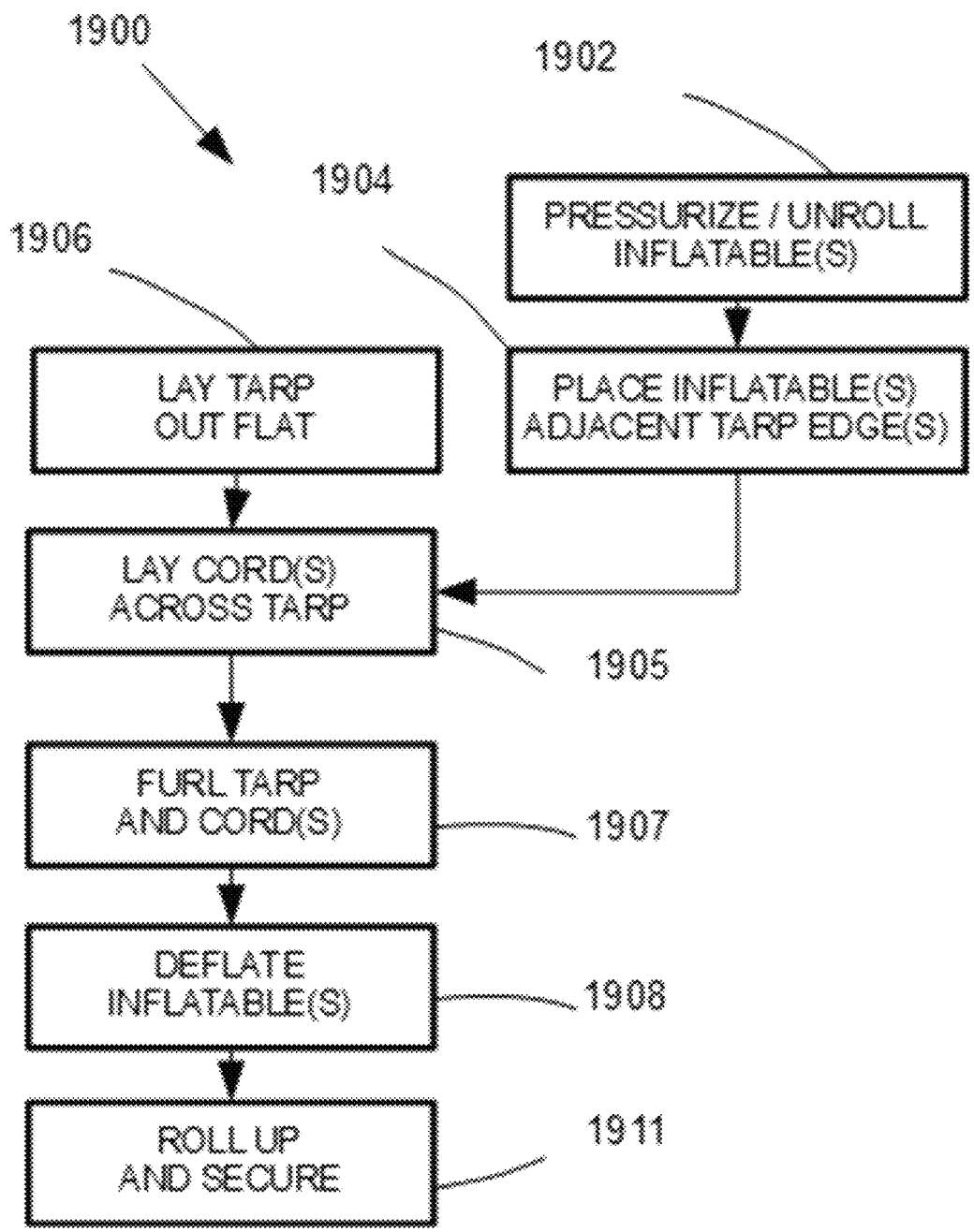
FIG. 19 illustrates a representative method for storing a flexible sheet of material such as a tarp.

Use of double furled tarp assemblies to cover trailer loads is illustrated in FIGS. 18A-18D. When a double furled tarp assembly 1809 is deployed with a forklift, inflatables 1823, 1824 are fully pressurized and a cord 1804, furled with tarp 1832 about inflatable 1824, is thrown over cargo 1801 before being lifted by the fork 1802 (FIG. 18A). Once the double furled tarp assembly 1809 reaches a height corresponding to the top of the cargo 1801 (FIG. 18B), the cord 1804 is pulled thereby rolling the inflatable 1824 off the fork 1802, unfurling the tarp 1832 and covering the cargo 1801 as the inflatable rolls over and down the far side of the cargo 1801 (FIG. 18C). After an edge of the tarp 1832 is secured to a rub rail 1835 the fork 1802 is lowered thereby unfurling the remainder of the tarp 1832 from the inflatable 1823 and completing the process of covering the cargo 1801 (FIG. 18D).

A method 1900 of storing a tarp or other sheet of flexible material comprises laying the tarp out flat 1906 on the ground. If the tarp has a flap, the flap is folded over onto the tarp and a cord can be attached to the flaps. A prolate inflatable is pressurized at 1902 and situated adjacent and edge of the tarp at 1904. If two inflatables are used, the second inflatable is also inflated and positioned along the opposite edge of the tarp. If the inflatables have attachment points along their length, the tarp can be attached to the inflatables. A cord is laid across the tarp at 1905 and, if there are attachment points along the inflatable, attached to the inflatable. If two inflatables are used, a separate cord may be used for each inflatable. The inflatable is rolled across the tarp such that the tarp and the cord are furled about the inflatable at 1907. If there are two inflatables, the inflatables are rolled towards each other such that the tarp is partially furled onto each inflatable. The cords, if used, are each furled with the tarp onto separate inflatables. Further, if two inflatables are used, another cord may be used to secure them into a position proximate one another. The one or two inflatables are then deflated at 1908 and subsequently rolled up and the tarp assembly is secured with a cord at 1911 for storage.

Figures 20, 21:
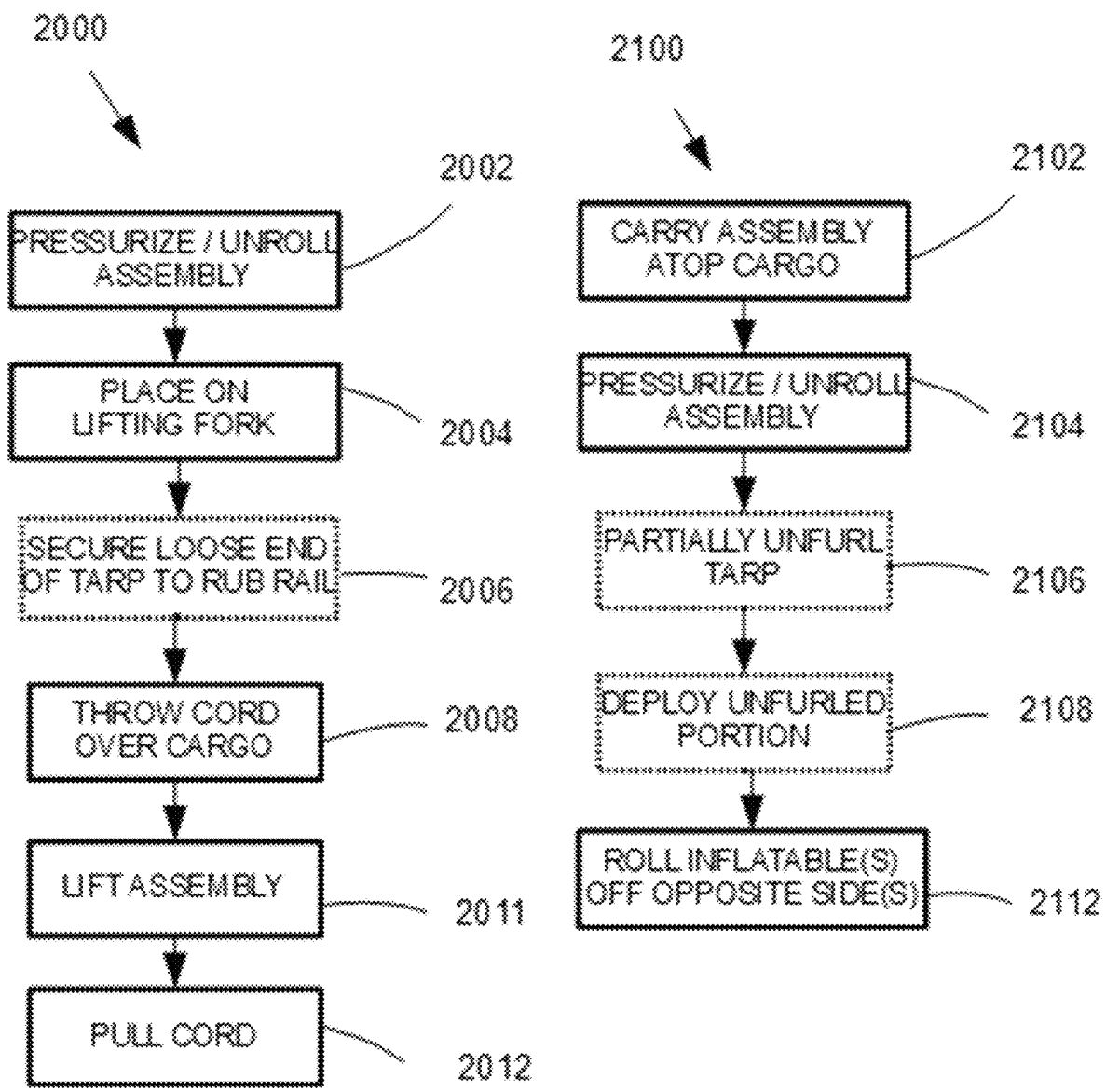
FIG. 20 illustrates a representative method for deploying a sheet of flexible material such as a tarp over an object, such as a loaded flatbed, with the assistance of a lifting fork, such as a fork lift.
FIG. 21 illustrates a representative method for manually deploying a sheet of flexible material such as a tarp over an object, such as a loaded flatbed.

Methods 2000, 2100 for deploying tarps can be accomplished with tarp assemblies comprising one or more inflatables. Some steps required for tarp assemblies comprising only a single inflatable are not required for tarp assemblies comprising multiple inflatables and are shown in boxes with dotted lines (FIGS. 20 and 21).

A method 2000 for deploying a tarp or other sheet of flexible material with a lifting fork comprises pressurizing the inflatable within a rolled up, furled tarp assembly thereby unrolling the tarp assembly at 2002. If there are two inflatables, both inflatables are pressurized. The tarp assembly is then placed on the tines of a lifting fork at 2004, for example, a forklift. If there are two inflatables and if they are bound together with a cord, the cord binding them is removed. If there is only a single inflatable and if the object being covered is cargo on a flatbed trailer, the tarp assembly is lifted to a height corresponding to the height of the rub rail and the loose end of the tarp is secured to the rub rail at 2006. The cord furled together to the with the tarp is then thrown up and over the object being covered at 2008. If there are two inflatables, the cord furled with the inflatable closest to the cargo is the one thrown. The tarp assembly is then lifted proximate the top of the object being covered at 2011. If there is only one inflatable, the tarp will unfurl as the tarp assembly is lifted. Once the tarp assembly is fully lifted, the cord is pulled from the far side of the object being covered thereby rolling the inflatable off the fork and unfurling the tarp over the object as the inflatable rolls across the top and down the far side at 2012. If there are two inflatables, the portion of tarp still furled on the inflatable on the fork unfurls as the fork is lowered. If the tarp has one or more flaps, in a final step (not shown) the cord or cords attached to the one or more flaps are pulled thereby deploying the one or more flaps over the corresponding sides of the object.

A method 2100 for deploying a tarp or sheet of flexible material manually comprises carrying a rolled up, furled tarp assembly atop the object being covered at 2102. The inflatable within a rolled up, furled tarp assembly is pressurized thereby unrolling the tarp assembly at 2104. If there are two inflatables, both inflatables are pressurized and further, if the two inflatables are secured proximate one another with a cord, the cord is removed. If there is a single inflatable, the cord furled with the tarp is pulled upward rolling the inflatable towards the operator thereby unfurling a portion of the tarp at 2106. The unfurled portion of the tarp is then thrown over the side of the object being covered at 2108. The inflatable is then rolled off the other side of the object thereby unfurling the tarp and covering the object at 2112. If there are two inflatables, the inflatables are rolled in opposite directions thereby covering both sides of the object. This step can also be performed from the ground by throwing the cord furled with the tarp over the side and subsequently pulling the cord from the ground. If the tarp has one or more flaps, in a final step (not shown) the cord or cords attached to the one or more are pulled from the ground thereby deploying the one or more flaps over the corresponding sides of the object.

General Considerations

For convenient description, a sheet of flexible material such as a tarp, fabric, canvas, mesh, or similar, is any sheet of material that might be used to cover an object and is sufficiently flexible to be furled about a pressurized prolate inflatable and subsequently rolled up after the inflatable is deflated. A sheet of flexible material may include, but is not limited to, sheets of mylar, kevlar, nylon, silk, woven, laminated, knitted or other fabrics, meshes made of fabric, plastic metal or other materials, sheets of paper, plastic, metal or other materials, and textiles coated with PVC, PTFE, acrylic, polyurethane, silicone, neoprene or other materials.

The term "tarp", frequently used in this application and in the claims to describe the disclosed systems, methods and apparatus, includes any sheet of flexible material unless the context clearly dictates otherwise. Additionally, unless the context clearly dictates otherwise, while the tarps described herein are frequently characterized with a length and width tarps also include non-rectangular shapes, for example circles, ovals, polygons and other shapes, that are not well necessarily well characterized by a length and width. Further, unless the context clearly dictates otherwise, tarps may have one or more flaps.

As used herein, a tarp assembly refers to an assembly comprising a sheet of flexible material furled about one or two or more inflatables. The assembly can further comprise one or more cords that can be attached to a flap, binding two inflatables proximate one another, furled with the tarp about an inflatable or securing the entire assembly is a configuration suitable for storage.

As used herein, a prolate form describes the general shape of an inflatable when pressurized. The prolate form has a length defined by the lengthwise separation between its ends, an effective diameter defined by the maximum circumference of the prolate form divided by π, the ratio of the circumference of a circle to its diameter, and an effective aspect ratio defined by the ratio of its length to its effective diameter. In general, the prolate form is substantially cylindrical although, as discussed above, the cross-section need not have a constant effective diameter along the lengthwise axis nor does it need to be rotationally symmetric. The prolate form need only be sufficiently cylindrical to permit a sheet of flexible material to be furled or unfurled about the inflatable when it is rolled and may, for example, have oval, arcuate, polygonal, elliptical, or other cross-sectional shapes. Further, the prolate form can have a length of at least 10, 12.5, 15, 17.5, 20, 25, 30, 35, 40, 45, or 50 ft, an effective diameter of at least 1, 1.5, 2, 2.5, or 3 ft, and an effective aspect ratio is at least 7.5, 10, 12.5, 15, 17.5, 20, 25, 30, 35, 40, 45, 50, or greater. Still further, the ends of the prolate form are typically ovoid wherein the term ovoid refers to sections of ovoids, including sections of spheroids, ellipsoids, paraboloids, and other shapes, but can also be flat.

As used herein, a lay-flat geometry is a configuration in which the inflatable could be fabricated from two identically shaped pieces of non-porous, pliable material secured to each other at the edges. With such a geometry, the inflatable is able to lay flat when deflated. While an inflatable with a lay-flat geometry could be fabricated from two identically shaped pieces of non-porous pliable material, as described above, other fabrication methods also enable lay-flat geometries.

As used herein, the term rolling generally refers to rolling the inflatable. When the inflatable is pressurized, the term rolling refers to rolling the inflatable about the lengthwise axis of the prolate form and results in either the furling or unfurling of a sheet of flexible material about the inflatable. When the inflatable is pressurized, rolling the inflatable does not change the shape of the inflatable. When the inflatable is deflated, rolling the inflatable changes its form. For this reason, and to establish a clear distinction that lends clarity, an inflatable in its deflated state is either rolled up or unrolled, but not rolled. When an inflatable is rolled up, the inflatable takes on a spiral form useful for storage, when an inflatable is unrolled through pressurization it goes from a spiral form to its pressurized prolate form, and when an inflatable is unrolled manually it goes from a spiral form to its lay-flat form.

As used herein, "attachment point" refers to a mechanism that permits a tarp or cord to be attached to an inflatable. In some cases, the attachment points are operable to provide releasable attachment, for example d-rings, grommets, snaps, loops, hooks, eyes, buckles, webbing loops, or other devices. In other cases, the attachment points are operable to provide permanent attachment, for example, welds, stitching, rivets, or similar.

We claim:

1. An inflatable for use in storage or deployment of a sheet of flexible material, comprising:
one or more portions of non-porous pliable material arranged to define an interior surface, an exterior surface, and an interior volume, wherein the interior volume, when pressurized, causes the exterior surface to take on a prolate form and wherein a stored state comprises a rolled state corresponding to rolling from a first end towards a second end, wherein multiple attachment points are situated on the exterior surface and extend along a length of the prolate form, wherein the multiple attachment points are suitable for attachment of a cord or the sheet of flexible material; and
at least one valve located substantially at the second end of the prolate form wherein the valve is operable to permit or inhibit a flow of a gas into or out of the interior volume such that an inflow of the gas is operable to unroll the inflatable from the stored state during inflation and an outflow of the gas is unimpeded during deflation and rolling from the first end towards the second end, wherein the stored state comprises a rolled state corresponding to rolling from a first end towards a second end about a first axis, and the cord is operable to exert the torque on the inflatable to cause the inflatable to roll and unfurl the sheet of material about a second axis that is different from the first axis.

2. The inflatable of claim 1, further comprising:
a cord secured to a selected one of the attachment points that is operable, when furled with the sheet of flexible material about the inflatable, to deploy the sheet of flexible material over an object to be covered by exerting a torque on the inflatable that causes the inflatable to roll, thereby unfurling the sheet of material.

3. The inflatable of claim 1, further comprising one or more handles secured to the exterior surface.

4. The inflatable of claim 1, further comprising a bladder situated within the interior volume, wherein the valve is coupled to the bladder and wherein the form of the bladder as pressurized is constrained by the one or more portions of non-porous pliable material.

5. The inflatable of claim 1, further comprising substantially circular end caps secured to the one or more portions of non-porous pliable material and form the ends of the prolate form.

6. The inflatable of claim 1, wherein the one or more portions of non-porous pliable material are arranged in a lay-flat geometry.

7. The inflatable of claim 6, wherein the lay-flat geometry is rectangular.

8. The inflatable of claim 6, wherein the lay-flat geometry includes ends that are substantially arcuate.

9. The inflatable of claim 1, wherein a length of the prolate form is at least 10 ft, and an effective diameter of the prolate form is at least 1 ft.

10. The inflatable of claim 1, wherein the non-porous pliable material comprises a coated textile.

11. A system for storing or deploying a sheet of flexible material, comprising:
at least one inflatable as recited in claim 1; and
a sheet of flexible material at least partially furled about the inflatable.

12. The system of claim 11, further comprising a pump couplable to the valve on the at least one inflatable.

13. The system of claim 11, wherein the cord is furled together with the sheet of flexible material and is operable, when the at least one inflatable is pressurized, to roll the inflatable in a direction that unfurls the sheet of flexible material.

14. The system of claim 11, further comprising multiple attachment points situated along a length of the at least one inflatable, wherein the multiple attachment points are suitable for the attachment of the cord.

15. The system of claim 14, wherein the cord is secured to the at least one inflatable and furled together with the sheet of flexible material and is operable, when the inflatable is pressurized, to roll the inflatable in a direction that unfurls the sheet of flexible material.

16. The system of claim 11, further comprising a hoist operable to lift the pressurized at least one inflatable to a height corresponding to the top of an object to be covered and wherein the hoist comprises a fork having one or more tines, each tine having a length greater than or equal to an effective radius of the at least one inflatable.

17. The system of claim 16, wherein the hoist comprises a forklift.

18. The system of claim 16, further comprising one or more stop blocks securable to distal portions of the one or more tines.

19. The system of claim 18, wherein the one or more stop blocks comprise at least one caster.

20. The system of claim 11, wherein the sheet of flexible material further comprises one or more flaps.

21. The system of claim 20, further comprising a cord attached to at least one of the one or more flaps.

22. The system of claim 11, wherein the at least one inflatable is a first inflatable and a second inflatable, and portions of the sheet of flexible material are furled about each of the first inflatable and the second inflatable.

23. The system of claim 22, wherein the sheet of flexible material and the first and second inflatables form a roll with the first and second inflatables uninflated.

24. The system of claim 23, where the at least one valve is a first valve associated with the first inflatable and a second valve associated with the second inflatable, wherein the first valve is situated at a first end of the first inflatable, the second valve is situated at a first end of the second inflatable, and the first ends are situated at a loose end of the roll formed by the furled sheet of flexible material and uninflated first and second inflatables.

25. The inflatable for use in storage or deployment of a sheet of flexible material of claim 1, wherein the cord is operable to extend across a cargo situated on a flatbed trailer and unfurl the sheet of material over the cargo when the torque is exerted by pulling the cord.

26. A method for covering an object with a sheet of flexible material, comprising:
pressurizing an inflatable having at least a portion of a sheet of flexible material furled about the inflatable with a gas so that the inflatable unrolls during inflation and wherein the inflatable, when fully pressurized, has a prolate form;
rolling the inflatable along an axis parallel to an axis of symmetry of the inflatable so as to unfurl at least a portion of the sheet of flexible material onto at least a portion of the object to be covered, wherein situating the inflatable comprises situating a first inflatable having a first portion of a flexible material furled about the first inflatable and a second inflatable having a second portion of the sheet of flexible material furled about the second inflatable;

pressurizing the second inflatable; and
rolling the second inflatable to at least partially unfurl the second portion of the sheet of flexible material onto at least a second portion of the object being covered.

27. The method of claim 26, further comprising:
attaching a loose end of the sheet of flexible material to a fixed object; and
lifting the pressurized inflatable proximate the top of the object being covered with forks of a hoisting mechanism, wherein a second portion of the rolling of the inflatable is accomplished by the lifting.

28. The method of claim 27, wherein stop blocks are secured to distal ends of fork tines to inhibit the inflatable from rolling off the fork tines during the lifting.

29. The method of claim 26, wherein the rolling of the second inflatable is accomplished by pulling a cord furled with the sheet of flexible material about the second inflatable.

30. The method of claim 29, further comprising:
lifting both the first and second pressurized inflatables proximate the top of the object being covered with forks of a hoisting mechanism, wherein the rolling of the second inflatable includes rolling the inflatable off the forks and onto the object being covered; and
lowering the first inflatable, wherein the second inflatable is still on the forks and wherein the unfurling of the first inflatable is accomplished by the lowering.

31. The method of claim 29, wherein the pressurization of the first and second inflatables causes the first and second inflatables to unroll.

32. The method of claim 31 wherein the first and second inflatables are situated above the object being covered before being pressurized.

33. A method for storing a sheet of flexible material, comprising:
situating an inflatable proximate an edge of the sheet of flexible material, wherein the inflatable, when pressurized, has a prolate form;
pressurizing the inflatable with a gas;
furling the sheet of flexible material at least partially about the inflatable so as to furl at least a portion of the sheet of flexible material about the inflatable;
deflating the inflatable;
rolling up the inflatable and the furled portion of the sheet of flexible material, wherein situating the inflatable comprise situating a first inflatable and a second inflatable proximate opposite edges of the sheet of flexible material, the first inflatable and the second inflatable having prolate forms when pressurized;
pressurizing the second inflatable with a gas;
rolling the second inflatable at least partially across the sheet of flexible material and towards the first inflatable to furl at least a second portion of the sheet of flexible material about the second inflatable;
deflating the second inflatable; and
rolling up the second inflatable and at least the second portion of the sheet of flexible material.

34. The method of claim 33, wherein an exterior surface of the inflatable further comprises multiple attachment points lengthwise along the inflatable.

35. The method of claim 34, further comprising:
attaching a cord or an edge of the sheet of flexible material to the inflatable with the multiple attachment points.

36. The method of claim 33, further comprising:
placing a cord about the first and second inflatables after the sheet of flexible material is at least partially furled such that first and second inflatables are secured in a position proximate one another.

37. The method of claim 33, further comprising placing a cord across the spread-out sheet of flexible material such that the cord is furled about either the first inflatable or the second inflatable when rolled.

38. A method for covering an object with a sheet of flexible material, comprising:
situating an inflatable having at least a portion of a sheet of flexible material furled about the inflatable proximate an object to be covered the inflatable having, when pressurized, a prolate form with an effective aspect ratio of at least 7.5; and
pressurizing the inflatable with a gas; and
rolling the inflatable so as to unfurl at least a portion of the sheet of flexible material onto at least a portion of the object to be covered, wherein situating the inflatable comprises situating a first inflatable having a first portion of a flexible material furled about the first inflatable and a second inflatable having a second portion of the sheet of flexible material furled about the second inflatable, and further comprising:
pressurizing the second inflatable; and
rolling the second inflatable so as to at least partially unfurl the second portion of the sheet of flexible material onto at least a second portion of the object being covered.

39. The method of claim 38, wherein the rolling of the second inflatable is accomplished by pulling a cord furled with the sheet of flexible material about the second inflatable.

40. The method of claim 39, further comprising:
lifting both the first and second pressurized inflatables proximate the top of the object being covered with forks of a hoisting mechanism, wherein the rolling of the second inflatable includes rolling the inflatable off the forks and onto the object being covered; and
lowering the first inflatable, wherein the second inflatable is still on the forks and wherein the unfurling of the first inflatable is accomplished by the lowering.

41. The method of claim 39, wherein the pressurization of the first and second inflatables causes the first and second inflatables to unroll.

42. The method of claim 41 wherein the first and second inflatables are situated above the object being covered before being pressurized.

43. A method for storing a sheet of flexible material, comprising:
spreading out the sheet of flexible material on a flat surface; and
situating an inflatable proximate an edge of the sheet of flexible material, wherein the inflatable, when pressurized, has a prolate form with an effective aspect ratio of at least 7.5;
pressurizing the inflatable with a gas;
rolling the inflatable at least partially about the sheet of flexible material so as to furl at least a portion of the sheet of flexible material about the inflatable;
deflating the inflatable; and
rolling up the inflatable and the furled portion of the sheet of flexible material, wherein situating the inflatable comprise situating a first inflatable and a second inflatable proximate opposite edges of the sheet of flexible material, the first inflatable and the second inflatable having prolate forms with an effective aspect ratio of at least 7.5 when pressurized; and
pressurizing the second inflatable with a gas;

rolling the second inflatable at least partially across the sheet of flexible material and towards the first inflatable so as to furl at least a second portion of the sheet of flexible material about the second inflatable;

deflating the second inflatable; and rolling up the second inflatable and at least the second portion of the sheet of flexible material.

44. The method of claim 43, further comprising:

placing a cord about the first and second inflatables after the sheet of flexible material is at least partially furled such that first and second inflatables are secured in a position proximate one another.

45. The method of claim 43, further comprising placing a cord across the spread out sheet of flexible material such that the cord is furled about either the first inflatable or the second inflatable when rolled.

* * * * *